US012684509B2

(12) United States Patent
    Rudolf

(10) Patent No.: US 12,684,509 B2
(45) Date of Patent: Jul. 14, 2026

(54) METHOD AND APPARATUS FOR TRANSMISSION TIMING USING TIMING ADVANCE IN FULL-DUPLEX SYSTEMS

(71) Applicant: Samsung Electronics Co., Ltd., Suwon-si (KR)

(72) Inventor: Marian Rudolf, Longueuil (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 18/058,813

(22) Filed: Nov. 25, 2022

(65) Prior Publication Data

US 2023/0180166 A1     Jun. 8, 2023

Related U.S. Application Data

(60) Provisional application No. 63/287,318, filed on Dec. 8, 2021.

(51) Int. Cl.
    *H04W 56/00*      (2009.01)
    *H04L 5/14*       (2006.01)
(52) U.S. Cl.
    CPC ....... *H04W 56/0045* (2013.01); *H04L 5/1469* (2013.01)
(58) Field of Classification Search
    None
    See application file for complete search history.

(56) References Cited

U.S. PATENT DOCUMENTS

| | | | |
|---|---|---|---|
| 2014/0008048 A1 | 1/2014 | Bisson | |
| 2018/0014301 A1 | 1/2018 | Chen et al. | |
| 2018/0084546 A1* | 3/2018 | Guo .................. | H04W 72/0446 |
| 2018/0270644 A1 | 9/2018 | Koorapaty et al. | |
| 2019/0222411 A1* | 7/2019 | Xie ..................... | H04L 27/2656 |

(Continued)

FOREIGN PATENT DOCUMENTS

| | | |
|---|---|---|
| WO | 2017218168 A1 | 12/2017 |
| WO | 2018204806 A1 | 11/2018 |

(Continued)

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

(Continued)

*Primary Examiner* — Abdelillah Elmejjarmi

(57) ABSTRACT

Methods and apparatuses for transmission timing using timing advance in full-duplex communication systems. A method for transmitting an uplink (UL) signal or channel associated with a transmission timing procedure includes receiving first information for a first timing advance value associated with a first subset of slots from a set of slots on a cell, second information for a second timing advance value associated with a second subset of slots from the set of slots on the cell, and third information for a condition. The method further includes determining whether the condition is valid for transmission in a slot from the second subset of slots and transmitting the UL signal or channel in the slot based on the first timing advance value when the condition is valid and the second timing advance value when the condition is not valid.

20 Claims, 15 Drawing Sheets

(56) References Cited

U.S. PATENT DOCUMENTS

| | | | |
|---|---|---|---|
| 2019/0246398 A1 | 8/2019 | Chen et al. | |
| 2020/0127771 A1 | 4/2020 | Papasakellariou | |
| 2020/0235980 A1* | 7/2020 | John Wilson | H04W 56/001 |
| 2020/0374822 A1 | 11/2020 | Dinan | |
| 2021/0250988 A1 | 8/2021 | Taherzadeh Boroujeni et al. | |
| 2021/0297976 A1* | 9/2021 | Medina Acosta ... | H04W 56/003 |
| 2021/0345362 A1 | 11/2021 | Kim et al. | |
| 2021/0352604 A1* | 11/2021 | Yang ................. | H04W 56/0045 |
| 2022/0015034 A1 | 1/2022 | Miao et al. | |
| 2022/0110117 A1 | 4/2022 | Bai et al. | |
| 2023/0075417 A1 | 3/2023 | Abotabl et al. | |
| 2023/0108216 A1* | 4/2023 | You ................... | H04W 56/0045 |
| | | | 370/503 |
| 2023/0179369 A1 | 6/2023 | Xu et al. | |
| 2023/0262635 A1* | 8/2023 | Tan ................... | H04W 56/0045 |
| | | | 370/350 |
| 2024/0147397 A1* | 5/2024 | Lin ................... | H04W 56/0045 |
| 2024/0172215 A1* | 5/2024 | Matsumura ....... | H04W 72/1263 |
| 2025/0038906 A1 | 1/2025 | Park et al. | |

FOREIGN PATENT DOCUMENTS

| | | | | |
|---|---|---|---|---|
| WO | 2019060197 A1 | 3/2019 | | |
| WO | WO2019042335 | * | 3/2019 | ............ H04W 74/00 |
| WO | 2021226396 A2 | 11/2021 | | |

OTHER PUBLICATIONS

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"5G; NR; Requirements for support of radio resource management (3GPP TS 38.133 version 16.8.0 Release 16)", ETSI TS 138 133 V16.8.0, Sep. 2021, 2886 pages.

International Search Report and Written Opinion issued Mar. 2, 2023 regarding International Application No. PCT/KR2022/019814, 8 pages.

International Search Report and Written Opinion issued Mar. 13, 2023 regarding International Application No. PCT/KR2022/019532, 8 pages.

Extended European Search Report issued Jan. 29, 2025 regarding Application No. 22904662.8, 8 pages.

Extended European Search Report issued Jan. 31, 2025 regarding Application No. 22901876.7, 8 pages.

USPTO, Office Action issued Feb. 14, 2025 regarding U.S. Appl. No. 18/058,685, 17 pages.

USPTO, Fianl Office Action issued Aug. 27, 2025 regarding U.S. Appl. No. 18/058,685, 20 pages.

USPTO, Notice of Allowance issued Dec. 1, 2025 regarding U.S. Appl. No. 18/058,685, 8 pages.

USPTO, Corrected Notice of Allowance issued Dec. 17, 2025 regarding U.S. Appl. No. 18/058,685, 7 pages.

* cited by examiner

700

800

900

1000

1100

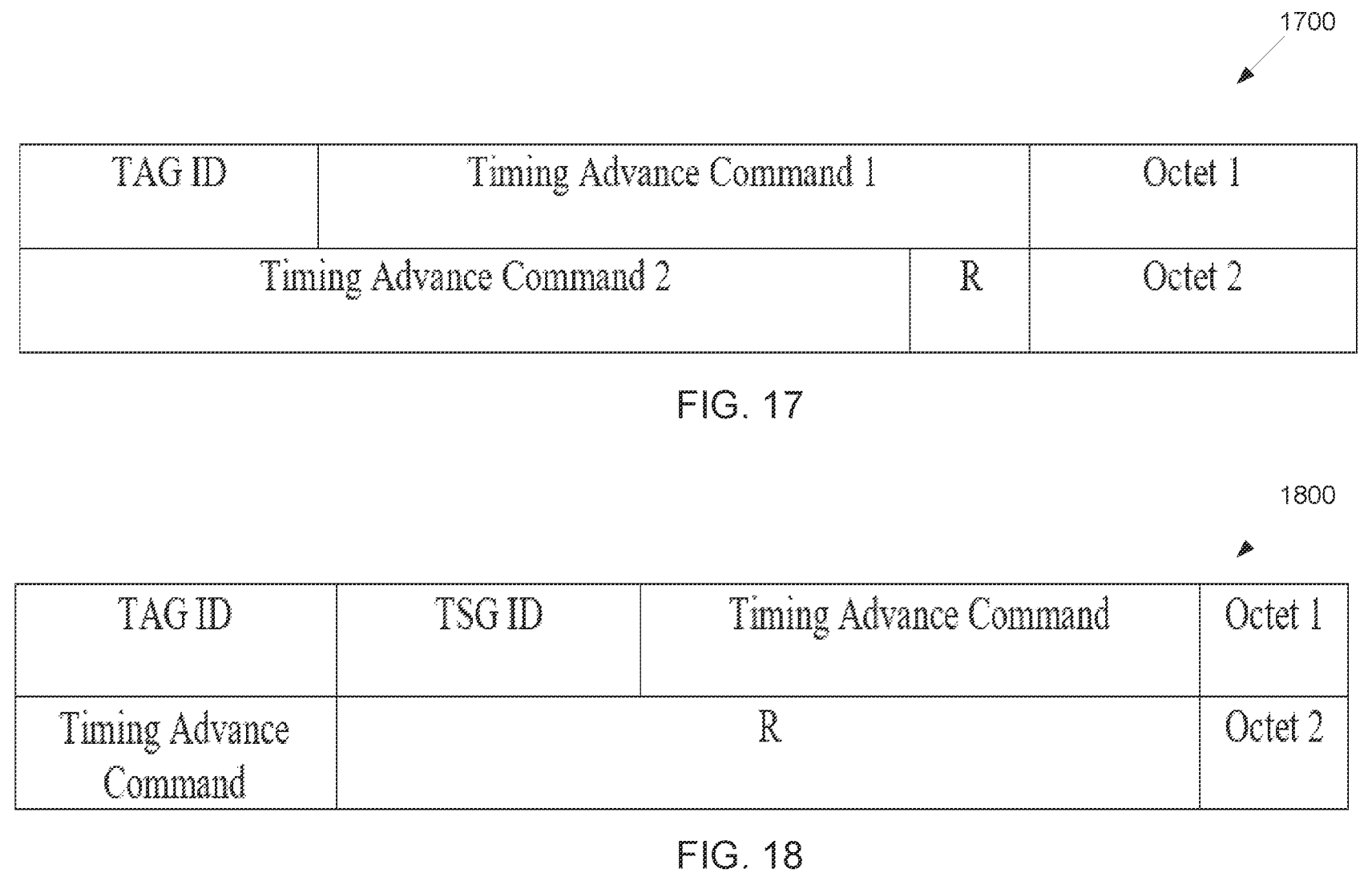

1700

| TAG ID | Timing Advance Command 1 | | Octet 1 |
|---|---|---|---|
| Timing Advance Command 2 | | R | Octet 2 |

| TAG ID | TSG ID | Timing Advance Command | Octet 1 |
|---|---|---|---|
| Timing Advance Command | | R | Octet 2 |

FIG. 18

METHOD AND APPARATUS FOR TRANSMISSION TIMING USING TIMING ADVANCE IN FULL-DUPLEX SYSTEMS

CROSS-REFERENCE TO RELATED APPLICATIONS AND CLAIM OF PRIORITY

The present application claims priority to U.S. Provisional Patent Application No. 63/287,318, filed on Dec. 8, 2021. The content of the above-identified patent document is incorporated herein by reference.

TECHNICAL FIELD

The present disclosure relates generally to wireless communication systems and, more specifically, the present disclosure relates to transmission timing using timing advance in full-duplex communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to transmission timing using timing advance in full-duplex communication systems.

In one embodiment, a method for transmitting an uplink (UL) signal or channel associated with a transmission timing procedure is provided. The method includes receiving first information for a first timing advance value associated with a first subset of slots from a set of slots on a cell, second information for a second timing advance value associated with a second subset of slots from the set of slots on the cell, and third information for a condition. The method further includes determining whether the condition is valid for transmission in a slot from the second subset of slots and transmitting the UL signal or channel in the slot based on the first timing advance value when the condition is valid and the second timing advance value when the condition is not valid.

In another embodiment, a user equipment (UE) is provided. The UE includes a transceiver configured to receive first information for a first timing advance value associated with a first subset of slots from a set of slots on a cell, second information for a second timing advance value associated with a second subset of slots from the set of slots on the cell, and third information for a condition. The UE further includes a processor configured to determine whether the condition is valid for transmission in a slot from the second subset of slots. The transceiver is further configured to transmit an UL signal or channel in the slot based on the first timing advance value when the condition is valid and the second timing advance value when the condition is not valid.

In yet another embodiment, a base station (BS) is provided. The BS includes a transceiver configured to transmit first information for a first timing advance value associated with a first subset of slots from a set of slots on a cell, second information for a second timing advance value associated with a second subset of slots from the set of slots on the cell, and third information for a condition. The BS further includes a processor configured to determine whether the condition is valid for reception in a slot from the second subset of slots. The transceiver is further configured to receive an UL signal or channel in the slot based on the first timing advance value when the condition is valid and the second timing advance value when the condition is not valid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 17 illustrates an example of multiple timing advance MAC CE according to embodiments of the present disclosure;

FIG. 18 illustrates an example of multiple timing advance MAC CE according to embodiments of the present disclosure;

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR, Physical channels and modulation"; 3GPP TS 38.212 v16.6.0, "NR, Multiplexing and Channel coding"; 3GPP TS 38.213 v16.6.0, "NR, Physical Layer Procedures for Control"; 3GPP TS 38.214 v16.6.0"; 3GPP TS 38.321 v16.5.0, "NR, Medium Access Control (MAC) protocol specification"; and 3GPP TS 38.331 v16.5.0, "NR, Radio Resource Control (RRC) Protocol Specification"; and 3GPP TS 38.133 v16.8.0, "NR; Requirements for support of radio resource management."

Figure 1:
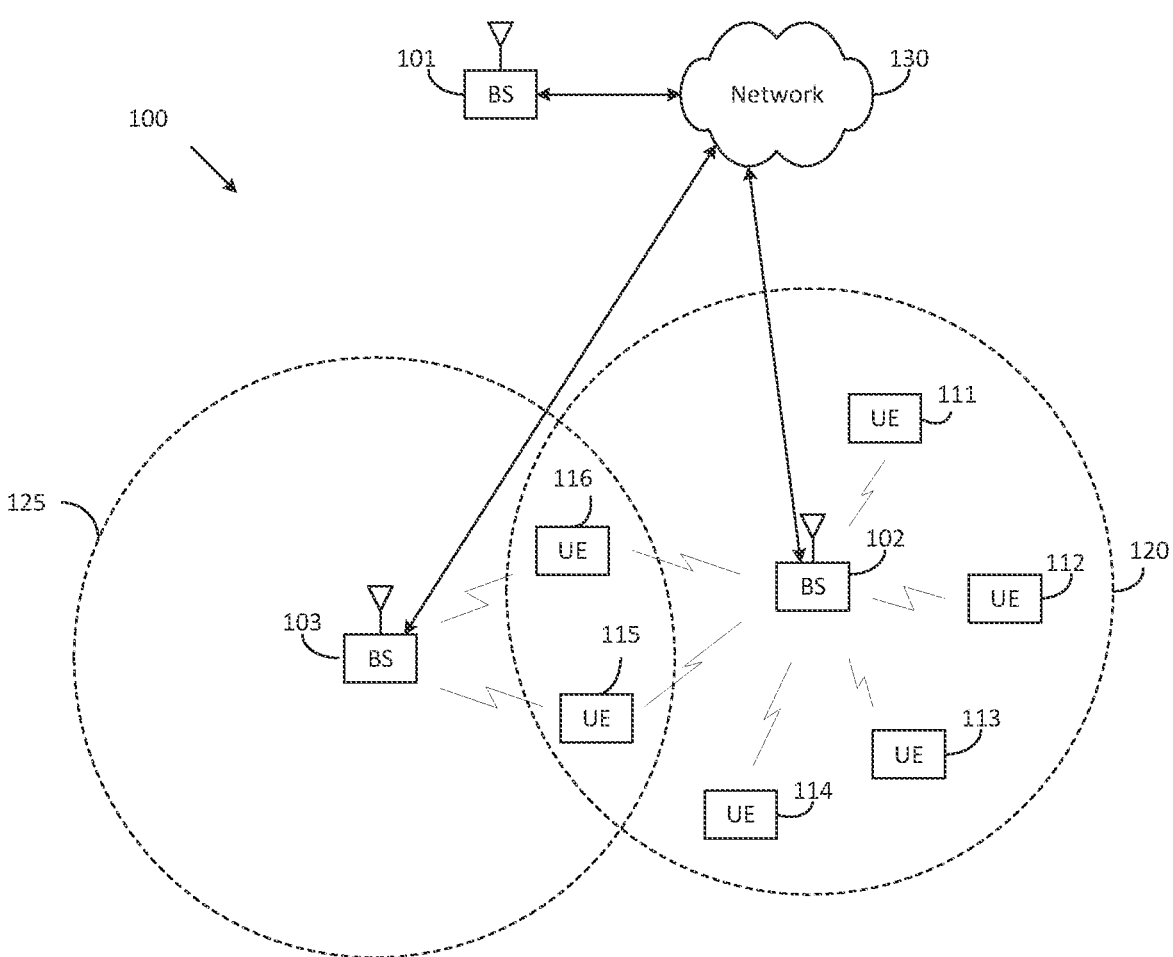
FIG. 1 illustrates an example of wireless network according to embodiments of the present disclosure.
Figure 2:
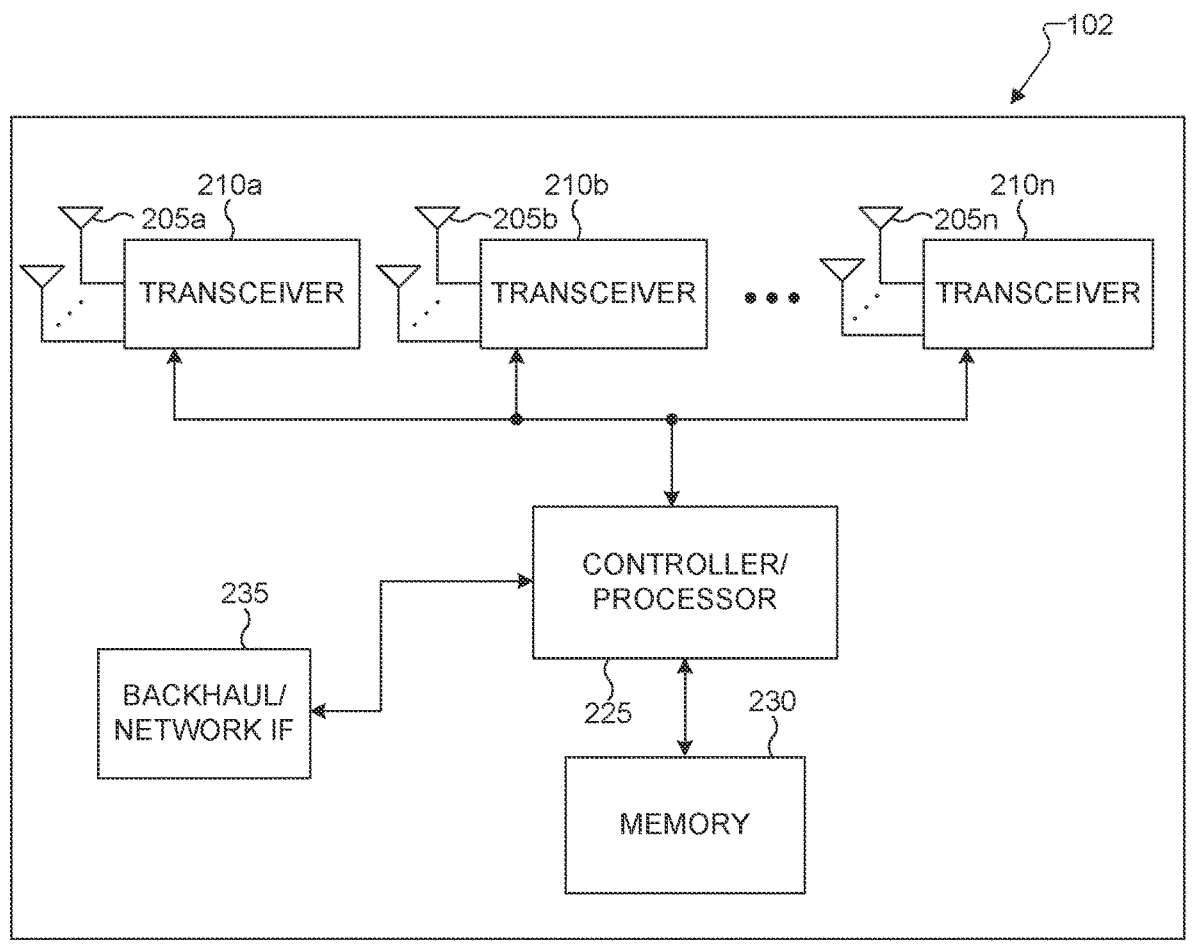
FIG. 2 illustrates an example of gNB according to embodiments of the present disclosure.
Figure 3:
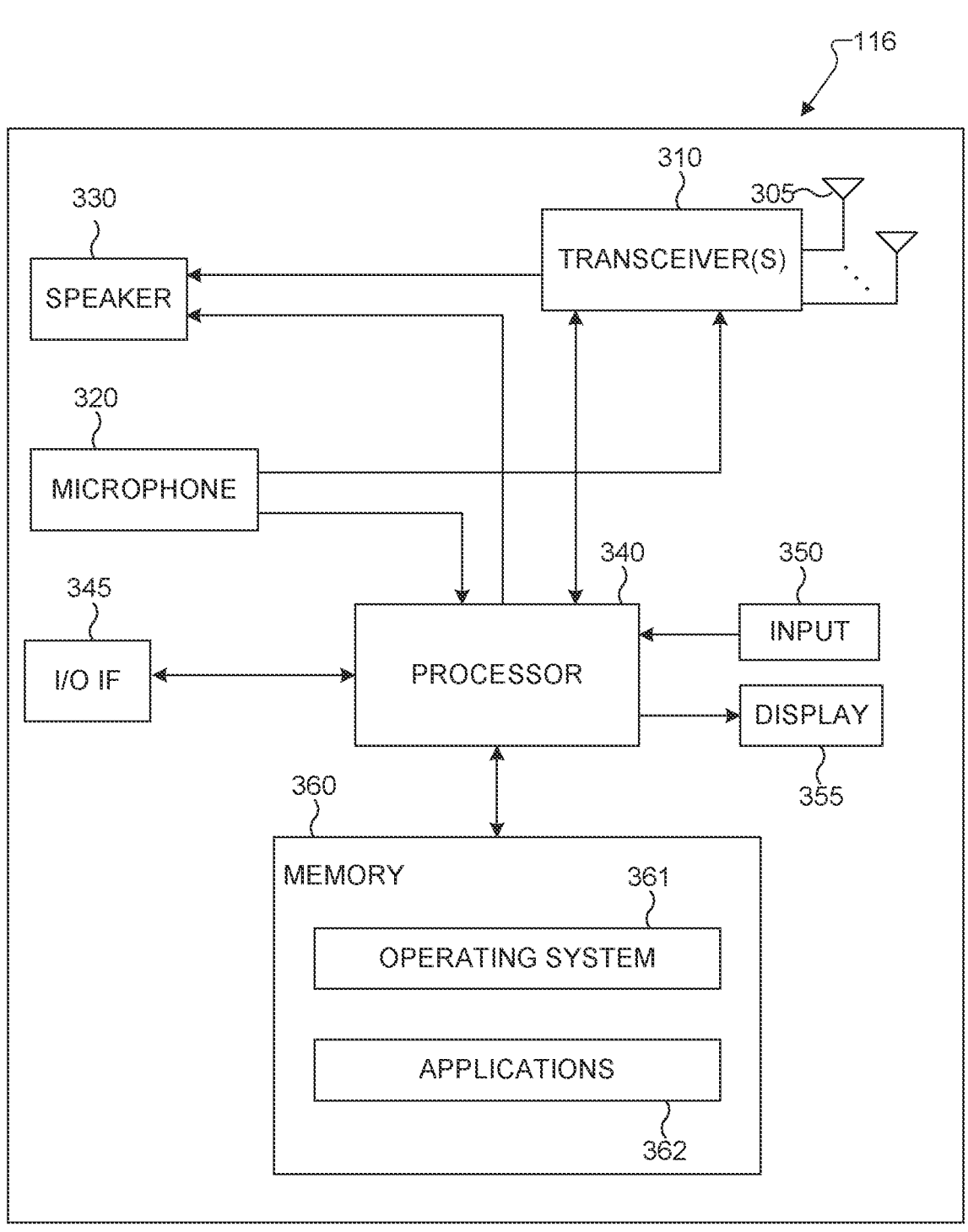
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for transmission timing using timing advance in full-duplex communication systems. In certain embodiments, and one or more of the gNBs 101-103 includes circuitry, programing, or a combination thereof, for transmission timing using timing advance in full-duplex communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support transmission timing using timing advance in full-duplex communication systems. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for transmission timing using timing advance in full-duplex communication systems. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
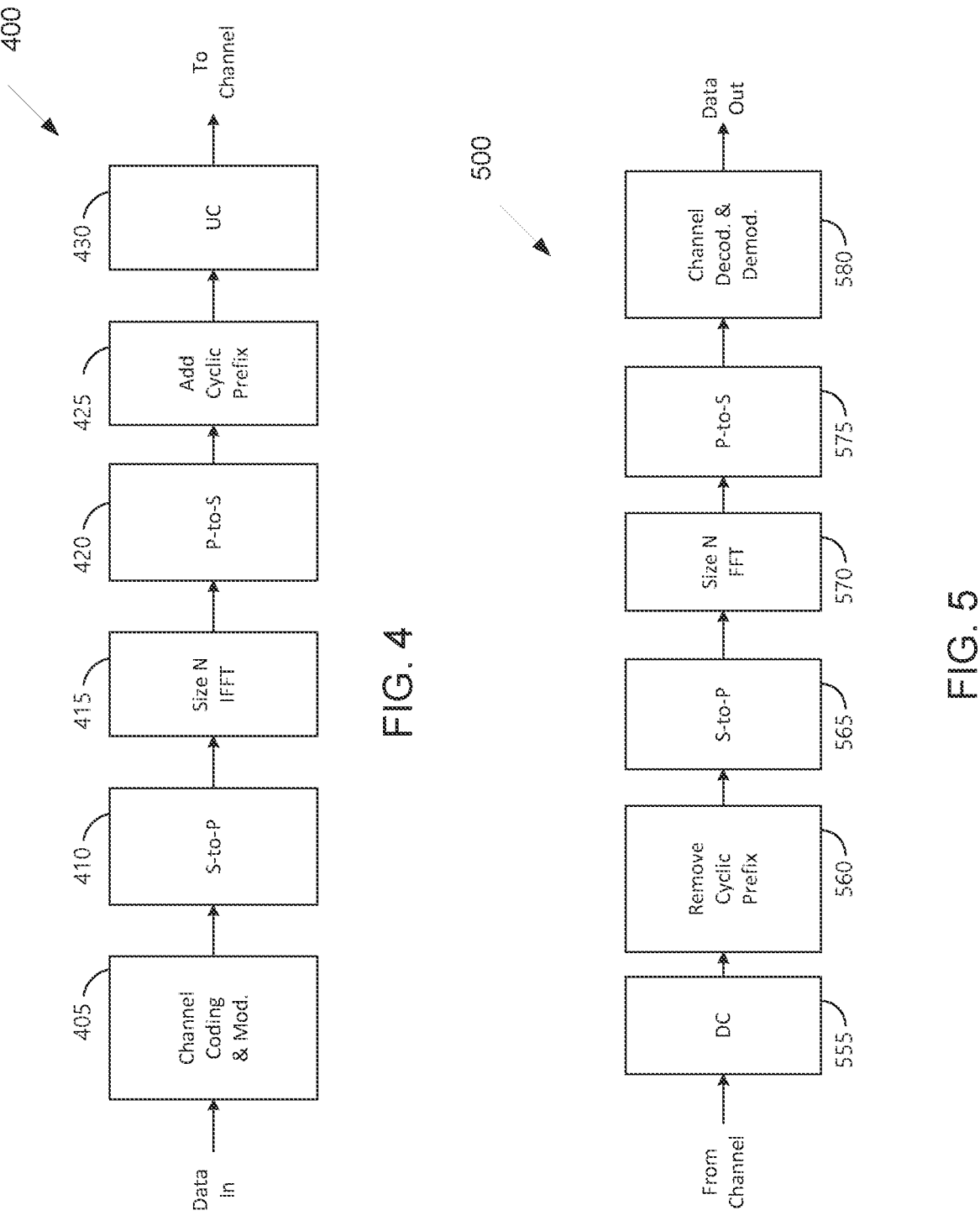
FIGS. 4 and 5 illustrate example of wireless transmit and receive paths according to this disclosure.
Figure 6:
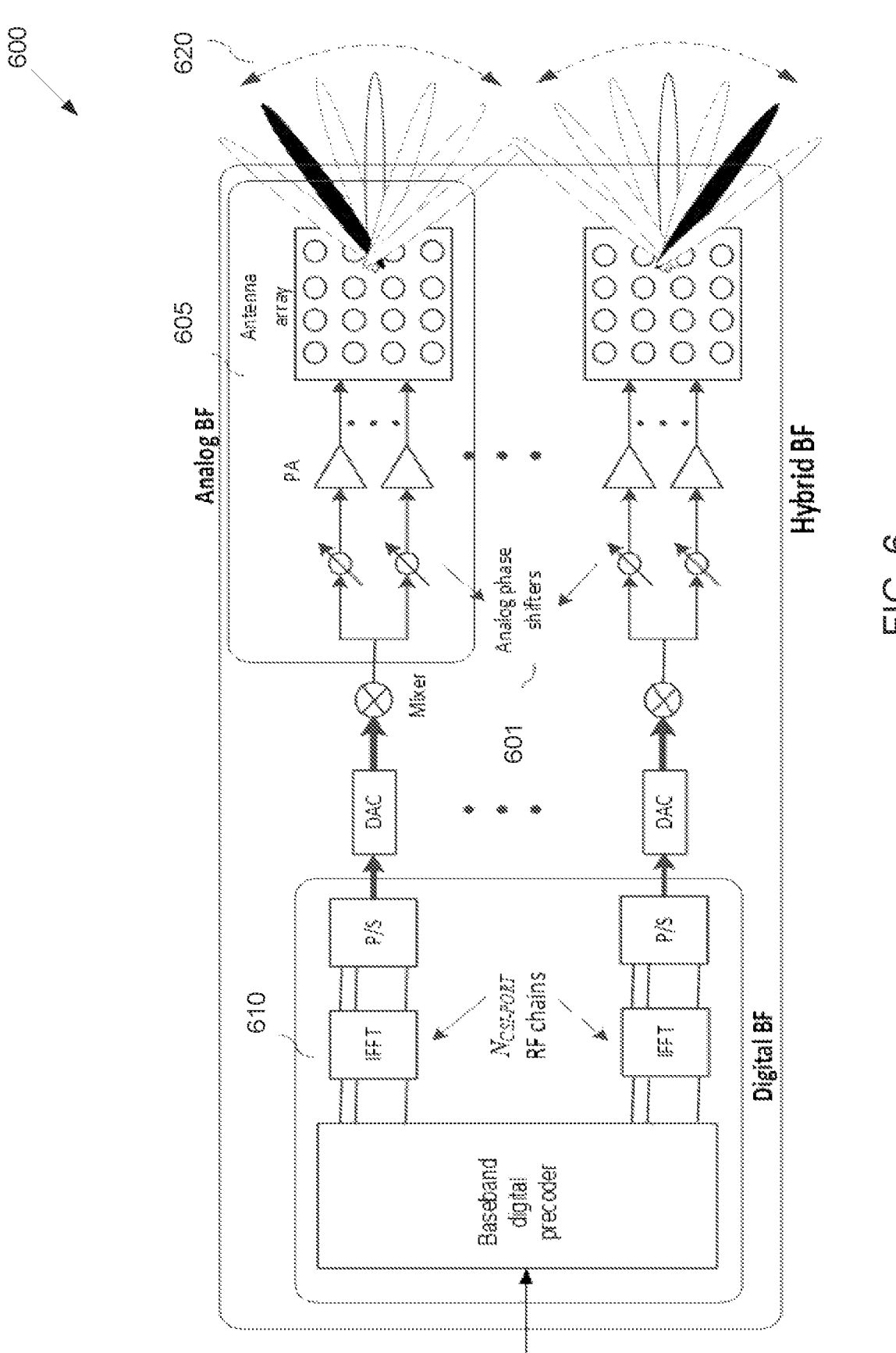
FIG. 6 illustrates an example of antenna structure according to embodiments of the present disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also NR specification). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an active UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same physical resource group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SSBs transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same CDM group is quasi co-located with respect to Doppler shift, Doppler spread, average delay, delay spread, and spatial Rx. The UE may also assume that DMRS ports associated with a PDSCH are QCL with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfig-uredTCIstatesPerCC. Each TCI-State contains parameters for configuring a quasi-colocation (QCL) relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types correspond-ing to each DL RS are given by the higher layer parameter qcl-Type in QCL-Info and may take one of the following values: QCL-TypeA: {Doppler shift, Doppler spread, aver-age delay, delay spread}; QCL-TypeB: {Doppler shift, Dop-pler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $$n + 3N_{slot}^{subframe,\mu}.$$

The NR UL allows for operation with intra-cell orthogo-nality. UL transmissions received from the UEs within a cell do not create interference to each other. This implies that UL slot boundaries for a given SCS may be received approxi-mately time aligned at the gNB. Ideally, the Rx timing misalignment between the UL signals from UEs may fall within the CP. Like LTE and other cellular communications systems, NR includes a UE UL transmit timing procedure. timing advance is a negative transmission time offset at the UE between the start of a DL slot as observed by the UE and the start of a slot in the UL. When the transmission time offset is controlled for each UE, the gNB can control the timing of the signals received at the gNB from the UEs. UEs far from the gNB have a larger propagation delay and need to start their UL transmissions more in advance compared to UEs located closer to the gNB.

The value of the timing advance for each UE can be determined by the gNB through different means. For example, measurements on the respective UL transmissions like SRS, PUCCH or PUSCH from the UEs can be used. When UEs carry out UL transmissions, the receiving gNB can estimate the UL receive timing and thus issue the corresponding timing advance (TA) commands in the DL. TA commands are UE specific and transmitted as a MAC CE on the DL-SCH. TA commands for a UE are transmitted relatively infrequently, e.g., one or a few times per second. When a UE moves fast, TA commands can be transmitted more frequently.

Because the target of the TA procedure is to keep the Rx timing misalignment between UL signals transmitted from UEs at the gNB within the size of the CP, the step size of the TA is chosen as a fraction of the CP. Different from LTE, NR supports multiple numerologies. The CP becomes shorter the higher the SCS, so the NR TA step size is scaled in proportion to the CP length and obtained by the SCS of the active UL BWP. When a UE has not received a TA command during a configurable time period, the UE assumes that the UE has lost UL synchronization. In this case, the UE may reestablish UL timing using the random access procedure first before any subsequent PUSCH or PUCCH transmission in the UL.

In the cases of carrier aggregation or dual connectivity, there may be two or more component carriers transmitted from a UE. When the different UL component carriers from the UE are all received at the same geographical location, a same TA value can be employed for all UL component carriers. When different UL component carriers are received at different geographical locations, the different UL carriers need different TA values to align the UL Rx timings at the distinct reception sites. This is the case for gNB deploy-ments using remote radio heads or with dual connectivity where different UL component carriers are terminated at different sites. In these cases, LTE and NR group the UL component carriers in timing advance groups (TAGs) and different TA commands apply to different TAGs. All com-ponent carriers in the same group are subject to the same TA command. The TA step size is determined by the highest SCS among the carriers in a TAG.

The NR DL and UL transmissions are organized into frames with $T_f=(\Delta f_{max}N_f/100)\cdot T_c=10$ ms duration, each including ten subframes of $T_{sf}=(\Delta f_{max}N_f/1000)\cdot T_c=1$ ms duration. The time units $T_c=1/(\Delta f_{max}\cdot N_f)$ where $\Delta f_{max}=480\cdot10^3$ Hz and $N_f=4096$ are defined by 3GPP stan-dard specification. The constant $\kappa=T_s/T_c=64$ where $T_s=1/(\Delta_{ref}\cdot N_{f,ref})$, $\Delta f_{ref}=15\cdot10^3$ Hz and $N_{f,ref}=2048$. The number of consecutive OFDM symbols per subframe is $$N_{symb}^{subframe,\mu} = N_{symb}^{slot} N_{slot}^{subframe,\mu}.$$

Each frame is divided into two equally-sized half-frames of five subframes each with half-frame 0 including subframes 0-4 and half-frame 1 including subframes 5-9. There is one set of frames in the UL and one set of frames in the DL on a carrier.

Figure 7:
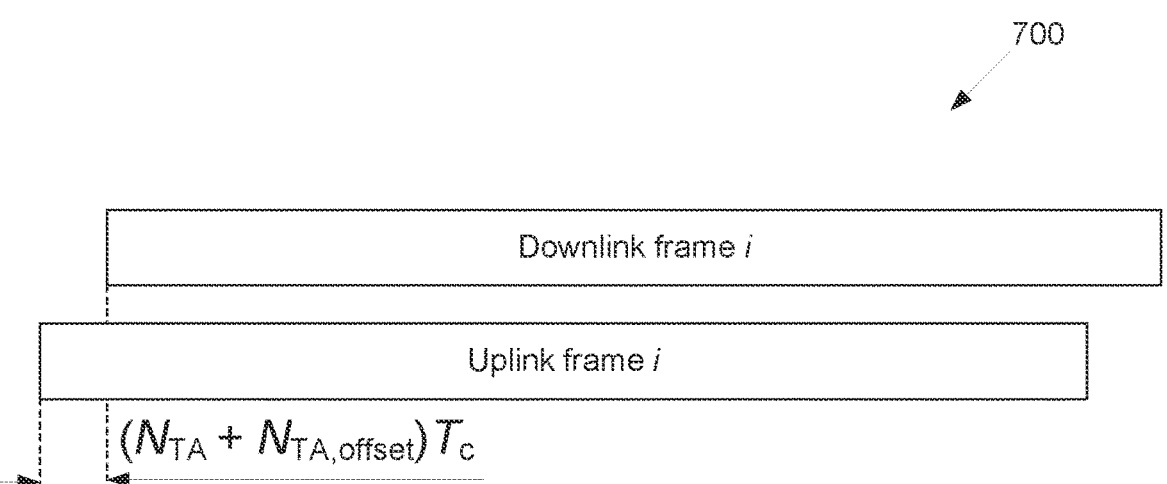
FIG. 7 illustrates an example of UL-DL timing relation in NR according to embodiments of the present disclosure.

FIG. 7 illustrates an example of UL-DL timing relation in NR 700 according to embodiments of the present disclosure. An embodiment of the UL-DL timing relation in NR 700 shown in FIG. 7 is for illustration only.

As shown in FIG. 7, a UL frame number i for transmission from the UE starts $T_{TA}=(N_{TA}+N_{TA,offset})T_c$ before the start of the corresponding DL frame at the UE where $N_{TA, offset}$ is given by 3GPP standard specification, except for MsgA transmission on PUSCH where $N_{TA}=0$ is used.

A UE can be provided a value $N_{TA, offset}$ of a timing advance offset for a serving cell by parameter n-TimingAd-vanceOffset for the serving cell. If the UE is not provided n-TimingAdvanceOffset for a serving cell, the UE deter-mines a default value $N_{TA,offset}$ of the timing advance offset for the serving cell as described in 3GPP standard specifi-cation. If a UE is configured with two UL carriers for a serving cell, a same timing advance offset value $N_{TA,offset}$ applies to both carriers.

A UE can be configured with one or more timing advance group (TAG). A TAG is a group of serving cells that is configured by RRC for cells with an UL using the same timing reference cell and the same timing Advance value. A timing advance group containing the SpCell of a MAC entity is referred to as primary timing advance group (PTAG), whereas the term secondary timing advance group (STAG) refers to other TAGs.

Upon reception of a timing advance command for a TAG, the UE adjusts UL timing for PUSCH, SRS, or PUCCH transmission on all the serving cells in the TAG based on a value $N_{TA,offset}$ that the UE expects to be same for all the serving cells in the TAG and based on the received timing advance command where the UL timing for PUSCH, SRS or PUCCH transmissions is the same for all the serving cells in the TAG.

For a band with synchronous contiguous intra-band EN-DC in a band combination with non-applicable maximum transmit timing difference requirements as described in 3GPP standard specification, if the UE indicates ul-Timin-gAlignmentEUTRA-NR as "required" and UL transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^\mu \cdot 15$ kHz, the timing advance command for a TAG indicates the change of the UL timing relative to the current UL timing for the TAG in multiples of $16 \cdot 64 \cdot T_c/2^\mu$. The start timing of the random access preamble is handled differently by the UE and described in 3GPP standard specification.

A timing advance command received by random access response or by an absolute timing advance command MAC CE (as illustrated in 3GPP standard specification), $T_A$, for a TAG indicates $N_{TA}$ values by index values of $T_A=0$, 1, 2, ..., 3846, where an amount of the time alignment for the TAG with SCS of $2^\mu \cdot 15$ kHz is $N_{TA}=T_A \cdot 16 \cdot 64/2^\mu$. $N_{TA}$ is defined in 3GPP standard specification and is relative to the SCS of the first UL transmission from the UE after the reception of the random access response or absolute timing advance command MAC CE. In other cases, a timing advance command received by timing advance command MAC CE (as illustrated in 3GPP standard specification), $T_A$, for a TAG indicates adjustment of a current $N_{TA}$ value, $N_{TA\_old}$, to the new $N_{TA}$ value, $N_{TA\_new}$, by index values of $T_A=0$, 1, 2, ..., 63, where for a SCS of $2^\mu \cdot 15$ kHz, $N_{TA\_new}=N_{TA\_old}+(T_A-31) \cdot 16 \cdot 64/2^\mu$.

If a UE has multiple active UL BWPs in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in 3GPP standard specification.

Adjustment of an $N_{TA}$ value by a positive or a negative amount indicates advancing or delaying the UL transmission timing for the TAG by a corresponding amount, respectively.

For a timing advance command received on UL slot n and for a transmission other than a PUSCH scheduled by a RAR UL grant or a fallbackRAR UL grant, or a PUCCH with HARQ-ACK information in response to a successRAR, the corresponding adjustment of the UL transmission timing applies from the beginning of UL slot n+k+1 where $$k = \lceil N_{slot}^{subframe,\mu} \cdot (N_{T,1} + N_{T,2} + N_{TA,max} + 0.5)/T_{sf} \rceil, N_{T,1}$$

is a time duration in msec of $N_1$ symbols corresponding to a PDSCH processing time for UE processing capability 1 (as illustrated in 3GPP standard specification) when additional PDSCH DM-RS is configured, $N_{T,2}$ is a time duration in msec of $N_2$ symbols corresponding to a PUSCH preparation time for UE processing capability 1 (REF4), $N_{TA,max}$ is the maximum timing advance value in msec that can be provided by a TA command field of 12 bits, $$N_{slot}^{subframe,\mu}$$

is the number of slots per subframe, and $T_{sf}$ is the subframe duration of 1 msec. $N_1$ and $N_2$ are determined with respect to the minimum SCS among the SCSs of all configured UL BWPs for all UL carriers in the TAG and of all configured DL BWPs for the corresponding downlink carriers.

For $\mu=0$, the UE assumes $N_{1,0}=14$ (as illustrated in 3GPP standard specification). Slot n and $$N_{slot}^{subframe,\mu}$$

are determined with respect to the minimum SCS among the SCSs of all configured UL BWPs for all UL carriers in the TAG. $N_{TA,max}$ is determined with respect to the minimum SCS among the SCSs of all configured UL BWPs for all UL carriers in the TAG and for all configured initial UL BWPs provided by initialUplinkBWP. The UL slot n is the last slot among UL slot(s) overlapping with the slot(s) of PDSCH reception assuming $T_{TA}=0$, where the PDSCH provides the timing advance command and $T_{TA}$ is defined in 3GPP standard specification.

If a UE changes an active UL BWP between a time of a timing advance command reception and a time of applying a corresponding adjustment for the UL transmission timing, the UE determines the timing advance command value based on the SCS of the new active UL BWP. If the UE changes an active UL BWP after applying an adjustment for the UL transmission timing, the UE assumes a same absolute timing advance command value before and after the active UL BWP change.

If the received DL timing changes and is not compensated or is only partly compensated by the UL timing adjustment without timing advance command as described in 3GPP standard specification, the UE changes $N_{TA}$ accordingly. If two adjacent slots overlap due to a TA command, the latter slot is reduced in duration relative to the former slot.

RRC configures the following parameters for the maintenance of UL time alignment: timeAlignmentTimer (per TAG) which controls how long the MAC entity considers the serving cells belonging to the associated TAG to be UL time aligned.

When a timing advance command MAC CE is received, and if an $N_{TA}$ as defined in 3GPP standard specification has been maintained with the indicated TAG, the MAC applies the timing advance command for the indicated TAG and starts or restarts the timeAlignmentTimer associated with the indicated TAG.

When a timing advance command is received in a random access response message for a serving cell belonging to a TAG or in a MsgB for an SpCell, the MAC applies the timing advance command for this TAG, starts or restarts the timeAlignmentTimer associated with this TAG if the random access preamble was not selected by the MAC entity among the contention-based random access preamble, else if the timeAlignmentTimer associated with this TAG is not running, it applies the timing advance command for this TAG and starts the the timeAlignmentTimer associated with this TAG. When Contention Resolution is considered not successful; the MAC entity stops the timeAlignmentTimer associated with this TAG.

When a timeAlignmentTimer associated with the primary TAG expires, the MAC entity flushes all HARQ buffers for all serving cells, notifies RRC to release PUCCH and/or SRS for all serving cells, and if configured, clears any configured DL assignments and configured UL grants, clears any PUSCH resource for semi-persistent CSI reporting, considers all running timeAlignmentTimers as expired, but maintains $N_{TA}$ (as illustrated in 3GPP standard specification) of all TAGs. A separate set of rules applies to the case when the timeAlignmentTimer associated with a secondary TAG expires.

When the MAC entity stops UL transmissions for an SCell due to the fact that the maximum UL transmission timing difference between TAGs of the MAC entity or the maximum UL transmission timing difference between TAGs of any MAC entity of the UE is exceeded, the MAC entity considers the timeAlignmentTimer associated with the SCell as expired.

The MAC entity does not perform any UL transmission on a serving cell except the random access preamble and MsgA transmission when the timeAlignmentTimer associated with the TAG to which this serving cell belongs is not running. Furthermore, when the timeAlignmentTimer associated with the primary TAG is not running, the MAC entity does not perform any UL transmission on any serving cell except the random access preamble and MsgA transmission on the SpCell.

Figure 8:
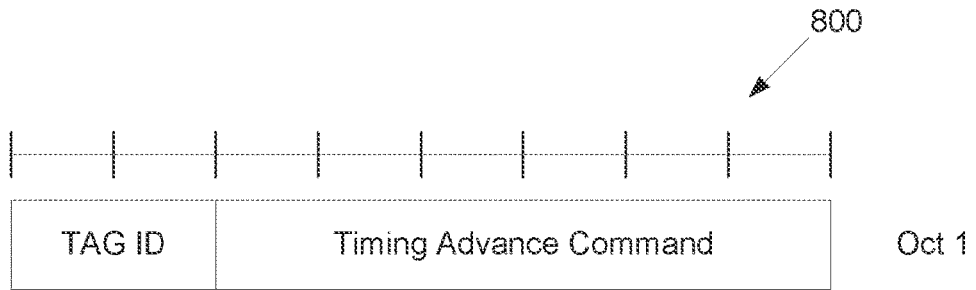
FIG. 8 illustrates an example of timing advance command MAC CE according to embodiments of the present disclosure.

FIG. 8 illustrates an example of timing advance command MAC CE 800 according to embodiments of the present disclosure. An embodiment of the timing advance command MAC CE 800 shown in FIG. 8 is for illustration only.

The timing advance command MAC CE is identified by MAC subheader with LCID=61 as defined in 3GPP standard specification. The timing advance command MAC CE has a fixed size and includes a single octet shown in FIG. 8. The timing advance command MAC CE contains the TAG identity (TAG ID) indicating the TAG identity of the addressed TAG. The TAG containing the SpCell has the TAG identity 0. The length of the field is 2 bits. This MAC CE then contains the timing advance command. This field indicates the index value $T_A$ (0, 1, 2 . . . 63) used to control the amount of timing adjustment that MAC entity may apply as defined in 3GPP standard specification. The length of the field is 6 bits.

Figure 9:
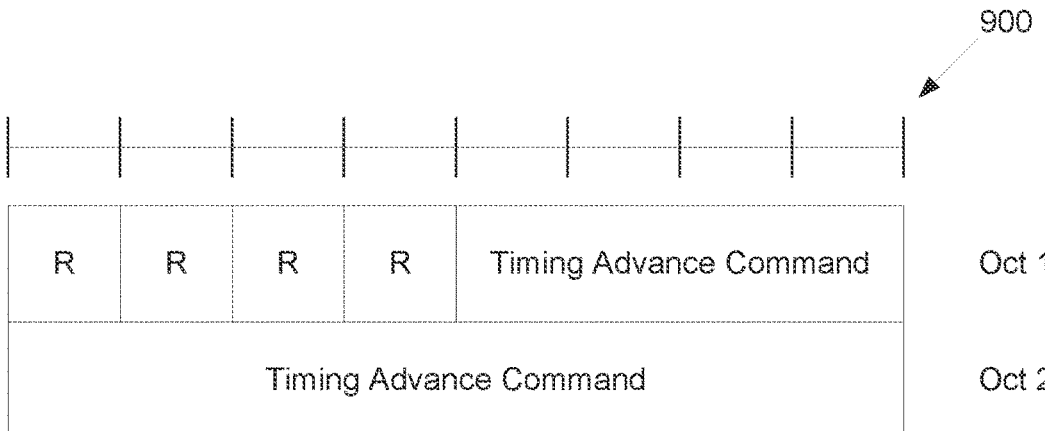
FIG. 9 illustrates an example of absolute timing advance command MAC CE according to embodiments of the present disclosure.

FIG. 9 illustrates an example of absolute timing advance command MAC CE 900 according to embodiments of the present disclosure. An embodiment of the absolute timing advance command MAC CE 900 shown in FIG. 9 is for illustration only.

The absolute timing advance command MAC CE is identified by MAC subheader with eLCID codepoint 252 as defined in 3GPP standard specification. The absolute timing advance command MAC CE has a fixed size and includes two octets shown in FIG. 9. The absolute timing advance command MAC CE contains the timing advance command. This field indicates the index value TA used to control the amount of timing adjustment that the MAC entity may apply as defined in 3GPP standard specification. The size of the field is 12 bits. The 4 reserved bits R are set to 0.

NR UEs may have the capability to follow the frame timing changes of the reference cell in an RRC_CONNECTED state. The UL frame transmission takes place $(N_{TA}+N_{TA\ offset})\times T_c$ before the reception of the first detected path (in time) of the corresponding DL frame from the reference cell. For serving cell(s) in the primary TAG, the UE uses the SpCell as the reference cell for deriving the UE transmit timing for cells in the primary TAG. For serving cell(s) in the secondary TAG, the UE can use any of the activated SCells as the reference cell for deriving the UE transmit timing for the cells in the secondary TAG. There are UE initial transmit timing accuracy, gradual timing adjustment and timing advance adjustment delay requirements.

The UE initial transmission timing error may be less than or equal to $\pm T_e$ where the timing error limit value $T_e$ as defined in 3GPP standard specification is shown in TABLE 1. This requirement applies when the UE initial transmission is the first transmission in a DRX cycle for PUCCH, PUSCH and SRS, or the UE initial transmission is the PRACH transmission, or the UE initial transmission is the MsgA transmission. The UE may meet the $T_e$ requirement for an initial transmission provided that at least one SSB is available at the UE during the last 160 msec.

The reference point for the UE initial transmit timing control requirement is the DL timing of the reference cell minus $(N_{TA}+N_{TA\ offset})\times T_c$. The DL timing is defined as the time when the first detected path (in time) of the corresponding DL frame is received from the reference cell. $N_{TA}$ for PRACH is defined as 0. $(N_{TA}+N_{TA\ offset})\times T_c$ (in $T_c$ units) for other channels is the difference between UE transmission timing and the DL timing immediately after when the last timing advance was applied. $N_{TA}$ for other channels is not changed until next timing advance is received. The value of $N_{TA,offset}$ is defined by 3GPP standard specification is shown in TABLE 2. $N_{TA,offset}$ depends on the duplex mode of the cell in which the UL transmission takes place and the frequency range.

TABLE 1

| Timing error limit value $T_e$ | | | |
|---|---|---|---|
| Frequency Range | SCS of SSB signals (kHz) | SCS of uplink signals (kHz) | $T_e$ |
| 1 | 15 | 15 | $12*64*T_c$ |
| | | 30 | $10*64*T_c$ |
| | | 60 | $10*64*T_c$ |
| | 30 | 15 | $8*64*T_c$ |
| | | 30 | $8*64*T_c$ |
| | | 60 | $7*64*T_c$ |
| 2 | 120 | 60 | $3.5*64*T_c$ |
| | | 120 | $3.5*64*T_c$ |
| | 240 | 60 | $3*64*T_c$ |
| | | 120 | $3*64*T_c$ |

Note 1:

$T_c$ is the basic timing unit defined in 3GPP standard specification

TABLE 2

| The value of $N_{TA, offset}$ | |
| --- | --- |
| Frequency range and band of cell used for uplink transmission | $N_{TA\ offset}$ (Unit: $T_C$) |
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

(Note 1):
The UE identifies $N_{TA, offset}$ based on the information n-TimingAdvanceOffset as specified in 3GPP standard specification. If UE is not provided with the information n-TimingAdvanceOffset, the default value of $N_{TA, offset}$ is set as 25600 for FR1 band. In case of multiple UL carriers in the same TAG, UE expects that the same value of n-TimingAdvanceOffset is provided for all the UL carriers according to 3GPP standard specification and the value 39936 of $N_{TA, offset}$ can also be provided for a FDD serving cell.

When the UE transmission is not the first transmission in a DRX cycle or there is no DRX cycle, and when the UE transmission is the transmission for PUCCH, PUSCH and SRS transmission, the UE may be capable of changing the transmission timing according to the received DL frame of the reference cell except when the timing advance is applied.

When the transmission timing error between the UE and the reference timing exceeds $\pm T_e$ then the UE is required to adjust the UE's timing to within $\pm T_e$. The reference timing is $(N_{TA}+N_{TA\ offset}) \times T_c$ before the DL timing of the reference cell.

All adjustments made by the UE to the UL transmit timing may follow these rules:

the maximum amount of the magnitude of the timing change in one adjustment is $T_q$;

the minimum aggregate adjustment rate is $T_p$ per second; and the maximum aggregate adjustment rate is $T_q$ per 200 ms, where the maximum autonomous time adjustment step $T_q$ and the aggregate adjustment rate $T_p$ as defined in 3GPP standard specification are shown in TABLE 3.

TABLE 3

| The maximum autonomous time adjustment step $T_q$ and the aggregate adjustment rate $T_p$ | | | |
| --- | --- | --- | --- |
| Frequency Range | SCS of uplink signals (kHz) | $T_q$ | $T_p$ |
| 1 | 15 | $5.5*64*T_c$ | $5.5*64*T_c$ |
| | 30 | $5.5*64*T_c$ | $5.5*64*T_c$ |
| | 60 | $5.5*64*T_c$ | $5.5*64*T_c$ |
| 2 | 60 | $2.5*64*T_c$ | $2.5*64*T_c$ |
| | 120 | $2.5*64*T_c$ | $2.5*64*T_c$ |

NOTE:
$T_c$ is the basic timing unit defined in 3GPP standard specification

When a UE operates in EN-DC, NR-DC, NE-DC or NR SA operation modes and receives a MAC CE that implies the adjustment of the timing advance as defined in 3GPP standard specification, the UE may adjust the timing of the UE's UL transmission timing at time slot n+k+1 for a timing advance command received in time slot n, and where the value of k is defined by 3GPP standard specification. The relative accuracy of the adjustment for the signalled timing advance value when compared to the timing of the preceding UL transmission may be better than or equal to the UE timing Advance adjustment accuracy requirement defined in 3GPP standard specification and shown in TABLE 4.

TABLE 4

| UE timing advance adjustment accuracy | | | | |
| --- | --- | --- | --- | --- |
| UL SCS (kHz) | 15 | 30 | 60 | 120 |
| UE timing Advance adjustment accuracy | $\pm256\ T_c$ | $\pm256\ T_c$ | $\pm128\ T_c$ | $\pm32\ T_c$ |

Rel-16 NR introduced support for the integrated access and backhaul (IAB) feature. IAB-nodes are infrastructure relaying nodes capable of wirelessly relaying the uplink or downlink transmissions or receptions between UEs and gNBs. IAB operation can use NR or LTE radio in FR1 or FR2. In the context of Rel-16 IAB operation, there is an additional relative timing adjustment mechanism. For time-domain synchronization across multiple backhaul hops, an additional IAB timing adjustment $T_{delta}$ can be provided to the IAB node by the parent node.

Figure 10:
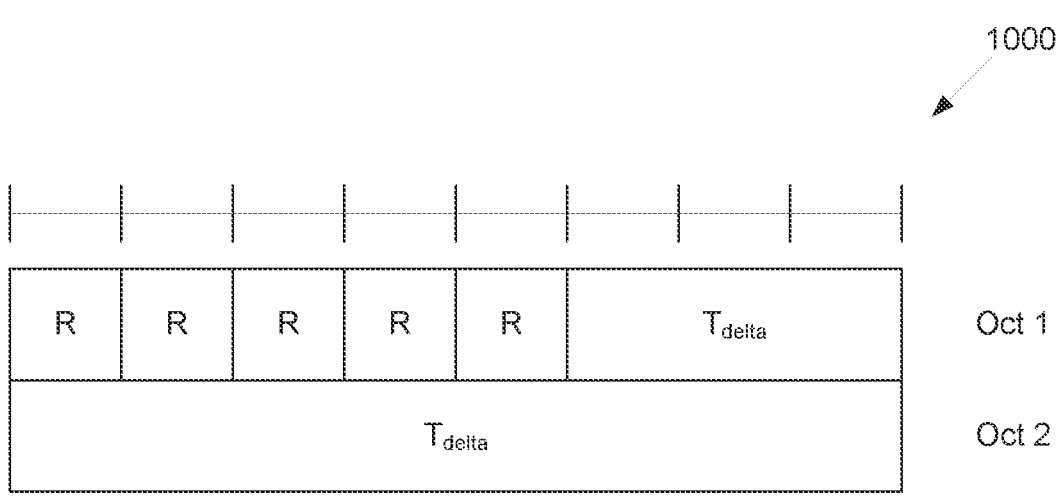
FIG. 10 illustrates an example of timing delta MAC CE for IAB according to embodiments of the present disclosure.

FIG. 10 illustrates an example of timing delta MAC CE for IAB 1000 according to embodiments of the present disclosure. An embodiment of the timing delta MAC CE for IAB 1000 shown in FIG. 10 is for illustration only.

This parameter is applicable only to IAB nodes and signaled using the timing delta MAC CE shown in FIG. 10. The timing delta MAC CE is identified by MAC subheader with eLCID codepoint 255. The timing delta MAC CE has a fixed size and includes two octets. The 5 reserved bits R are set to 0. $T_{delta}$ indicates the value (0, 1, 2 . . . 1199) used to control the amount of timing adjustment that MAC entity indicates and is defined in 3GPP standard specification. The length of the field is 11 bits.

If an IAB-node is provided an index $T_{delta}$ in a timing delta MAC CE from a serving cell, the IAB-node may assume that $(N_{TA}/2+N_{delta}+T_{delta} \cdot G_{step}) \cdot T_c$ is a time difference between a DU transmission of a signal from the serving cell and a reception of the signal by the IAB-MT when $N_{TA}/2+N_{delta}+T_{delta} \cdot G_{step}>0$. The IAB-node may use the time difference to determine an IAB-DU transmission time.

$N_{TA}$ is obtained as for a "UE" in 3GPP standard specification for the TAG containing the serving cell. $N_{delta}$ and $G_{step}$ are determined as:

$N_{delta}$=−70528 and $G_{step}$=64, for an FR1 serving cell providing the timing delta MAC CE; and $N_{delta}$=−17664 and $G_{step}$=32, for an FR2 serving cell providing the timing delta MAC CE.

Figure 11:
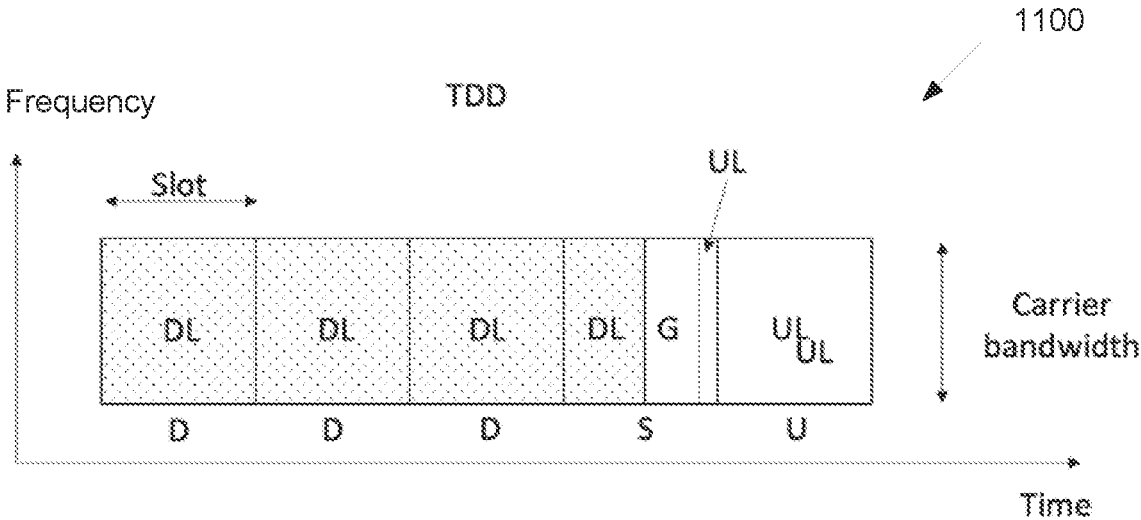
FIG. 11 illustrates an example of TDD communications system according to embodiments of the present disclosure.

FIG. 11 illustrates an example of TDD communications system 1100 according to embodiments of the present disclosure. An embodiment of the TDD communications system 1100 shown in FIG. 11 is for illustration only.

5G NR radio supports TDD operation and FDD operation. Use of FDD or TDD depends on the NR frequency band and per-country allocations. TDD is required in most bands above 2.5 GHz. FIG. 11 illustrates an example structure of slots or single-carrier TDD UL-DL frame configuration for a TDD communications system according to the embodiments of the disclosure.

A DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, a dynamic adaptation of link direction has been considered where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in 3GPP standard specification, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap.

A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with a full-duplex mode even when a UE still operates in a half-duplex mode, such as when the UE can either transmit and receive at a same time, or the UE can also be capable for full-duplex operation.

A full-duplex transmission/reception is not limited to gNBs, TRPs, or UEs, but can also be used for other types of wireless nodes such as relay or repeater nodes.

A full duplex operation needs to overcome several challenges in order to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, cross-division-duplex (XDD) is used as a short form for a full-duplex operation. The terms XDD and full-duplex are interchangeably used in the disclosure.

A full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 12:
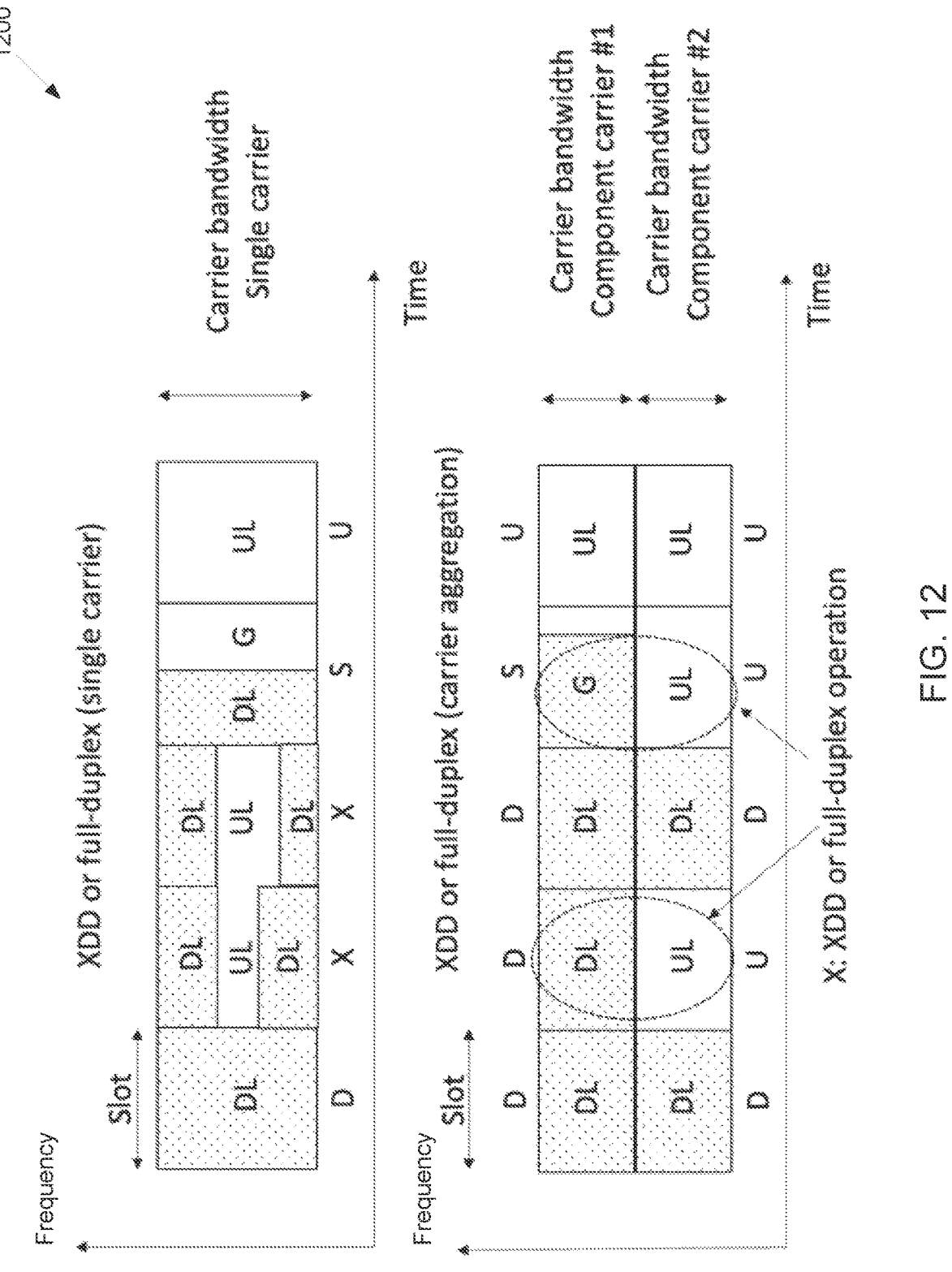
FIG. 12 illustrates an example of full-duplex communication system configurations according to embodiments of the present disclosure.

FIG. 12 illustrates an example of full-duplex communication system 1200 configurations according to embodiments of the present disclosure. An embodiment of the full-duplex communication system 1200 shown in FIG. 12 is for illustration only.

For a single carrier TDD configuration with full-duplex enabled, slots denoted as X are full-duplex or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station.

A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A full-duplex UE can transmit and receive simultaneously in symbols of an XDD slot, possibly in presence of other UEs scheduled or assigned resources for either DL or UL in the symbols of the XDD slot. A transmissions by a UE in a first XDD slot can use same or different frequency-domain resources than in a second XDD slot, wherein the resources can differ in bandwidth, a first RB, or a location of the center carrier.

For a dual-carrier (carrier aggregation) TDD configuration with full-duplex enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex operation. UL transmissions can also occur in a last slot (U) where the full UL transmission bandwidth is available. XDD slots or symbol assignments over a time period/number of slots can be indicated by a DCI format in a PDCCH reception and can then vary per unit of the time period, or can be indicated by higher layer signaling, such as via a MAC CE or RRC.

In NR TDD network deployments, the choice of the UL-DL frame configuration impacts the relative capacity split between DL and UL, the achievable DL and UL latencies for data and control signaling, and the maximum cell radius. A guard period (GP) with no scheduled DL or UL transmissions is required to separate the DL and UL allocations in the TDD system. The duration of the GP measured in microseconds defines a safety zone distance beyond which the DL and UL may start overlapping and interfere each other even if the TDD network is perfectly synchronized. Dimensioning of the safety zone distance in TDD networks first accounts for deployment and signal propagation aspects. At the speed of light, the radio waves travel 300 m in 1 μs. To achieve a 15 km safety range, about 50 μs GP may be required from when the transmitter switches off to when the receiver is switched on. If a 40 km safety zone is required, a 134 μs GP may be necessary.

In LTE TDD networks, the duration of GPs is provided through the selection of up to 9 different Special Subframe formats. In NR TDD networks, the slot formats defined in 3GPP standard specification provide the number of guard symbols. The dimensioning for the safety distance provided by the choice of the GP duration may also consider transient periods for switching off the transmitter as well as the timing advance offset. Both these factors reduce the practical safety range obtained from accounting for BTS-to-BTS propagation and signal attenuation in the TDD deployment.

A greater GP allows for larger safety zones and allows to better tolerate network and UE side timing alignment errors, but the GP comes at the cost of capacity and peak throughput. For example, for SCS=30 kHz with DDDSU and a GP of 5 symbols provided by the NR slot format in the special slot, a 50 km safety zone is dimensioned, but it costs around 7% of the system capacity. For SCS=30 kHz, typical settings in NR TDD macro networks for the number of guard symbols are 2 or 4. Controlling the UE timing advance is an important mechanism in TDD networks to avoid UL-to-DL or DL-to-UL interference given the provided duration of the GP to separate DL and UL transmission periods.

When considering NR TDD networks with support for full-duplex or XDD operation, proper timing control and determination of the UL transmit timing become significantly more challenging due to the addition of more UL-to-DL and DL-to-UL interference paths during system operation.

Figure 13:
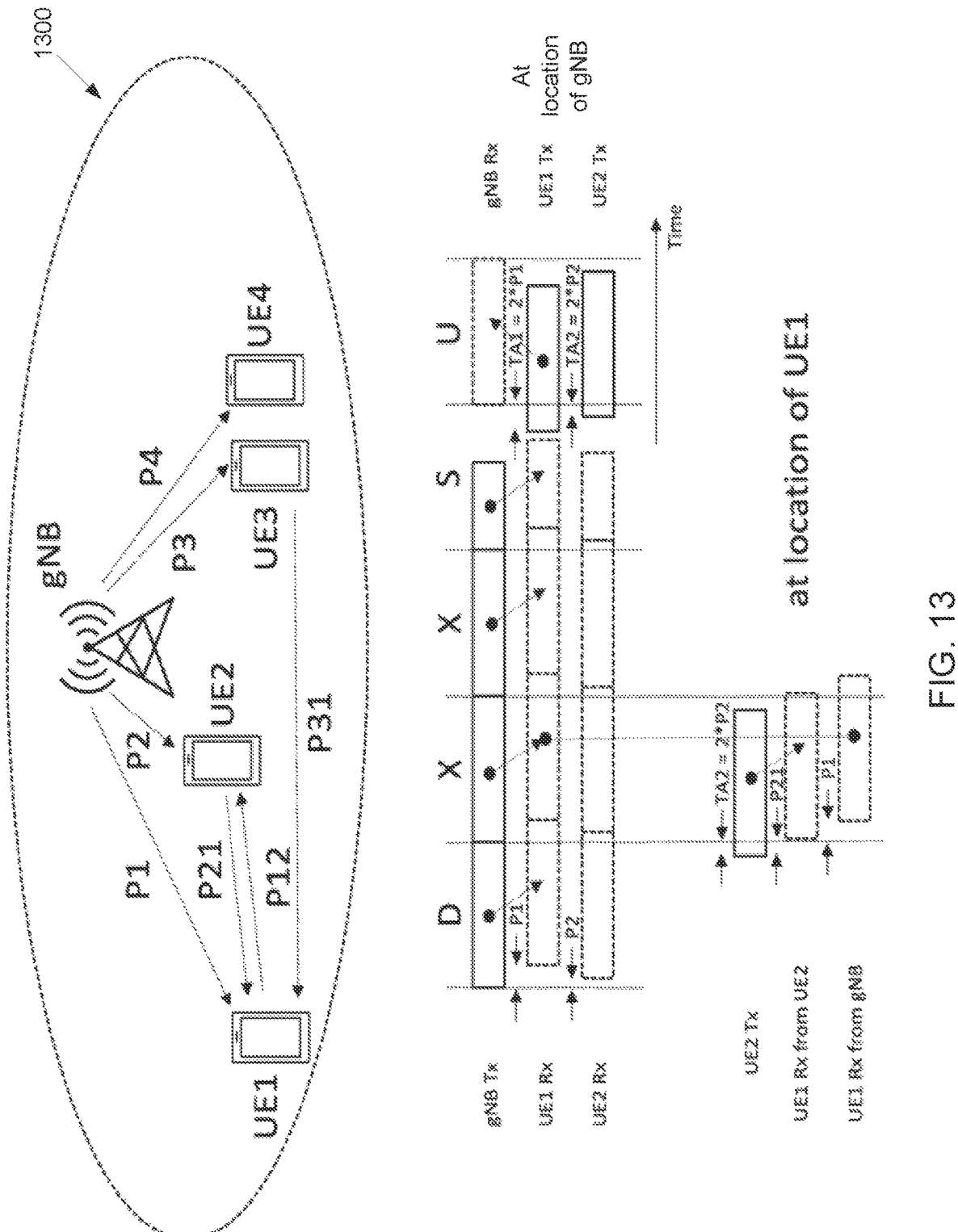
FIG. 13 illustrates an example of Tx and Rx timings in a full-duplex communications system according to embodiments of the present disclosure.

FIG. 13 illustrates an example of Tx and Rx timings in a full-duplex communications 1300 system according to embodiments of the present disclosure. An embodiment of the Tx and Rx timings in a full-duplex communications 1300 shown in FIG. 13 is for illustration only.

In FIG. 13, the NR TDD gNB uses SCS=30 kHz and a UL-DL frame allocation of type a DDDSU with duration 2.5 msec. A UE1, a UE2, a UE3, and a UE4 are served by gNB. Note that the timing advance settings TA1, $T_{A2}$, TA3, and TA4 for the UE1, the UE2, the UE3, and the UE4 are determined based on the respective UE distances to gNB. Transmissions and receptions from the gNB to the UE1, the UE2, the UE3, and the UE4 are subject to one-way propagation delays P1, P2, P3, and P4, respectively.

A full-duplex communication is supported by the gNB and enabled for the 2nd and $3^{rd}$ slot, e.g., DXXSU. A full-duplex communication in the TDD cell uses frequency-orthogonal subbands, e.g., DL transmissions from the gNB to a UE and UL reception from a UE by the gNB do not overlap in frequency domain. UL transmissions in full-duplex slots can be allocated to the center subband in the $2^{nd}$ and $3^{rd}$ slot. The UE1-UE4 operate half-duplex, e.g., they can either transmit or receive in a slot, but no simultaneous DL reception and UL transmission from a same UE can occur in a slot. The small relative distance from UE1 to the gNB results in a small TA1 value. UE2 is further away from the gNB and requires a larger TA2 value. The UE3 and UE4 require timing advance values with TA1<TA3<TA4<TA2.

FIG. 13 shows the relative Tx and Rx timings of transmissions for 2 cases, first when received at the gNB location and second when received at the location of UE1. Interfering UL transmissions from the UE2 in the $2^{nd}$ XDD slot are received by UE1 earlier than DL transmissions from the gNB in the slot. A UL transmissions from UE2 interfere not only the PDSCH simultaneously transmitted by the gNB to the UE1 in the $2^{nd}$ slot, but also the symbols carrying PDCCH at the beginning of the $2^{nd}$ slot.

Arrival time of the interfering UL transmission from the UE2 at the location of the UE1 during DL reception by UE1 in the $2^{nd}$ slot is determined by 3 relative one-way propagation delays, e.g., UE2-gNB (P2), UE1-gNB (P1) and UE2-UE1 (P21). Note that UL-DL interference in the $2^{nd}$ slot occurs even with subband full-duplex operation. The roll-off of the filtered Tx OFDM BB waveform from the UE2 creates leakage across the entire channel BW including the DL subband(s) used for DL reception by the UE1. Guard RBs or guard tones between the UL and DL subband(s) in the 2nd slot can mitigate, but not fully eliminate leakage created by the UL-to-DL interference from UE2 UL transmissions.

The amount of leakage and their impact on UE1 demodulation performance depends on the DL receive power levels of the desired DL signal and the interfering UL signal which are a function of the gNB DL transmit power or EPRE, the distance between the gNB and the UE1, the UE2 UL transmit power or EPRE, the distance between the UE2 and the UE1 and the amount of Tx and/or Rx filtering by the UE1 and the UE2.

Although not shown in FIG. 13, UE-to-UE or UL-to-DL interference during full-duplex operation can also affect the subsequent, e.g., $3^{rd}$ XDD slot. When the UE1 is closer to the gNB, the UE uses a smaller $T_{A1}$ value. Interfering UL transmissions from UE2 in the $2^{nd}$ slot may then be received later than the DL transmissions from the gNB for a sufficiently large P21. Interference from the UE2 from UL transmissions in the $2^{nd}$ slot may then affect the first received symbol(s) of the $3^{rd}$ slot.

When considering transmissions in a full-duplex capable communication system several issues of existing state-of-the-art technology need to be overcome.

A first issue relates to the timing advance procedure in a TDD cell supporting full-duplex operation. The existing TA procedure controls the UE UL transmit timing with respect to the propagation delay of the UE to the gNB. The purpose of the existing timing advance procedure is to align the receive timings of multiple UL signals transmitted by multiple UEs at the location of the gNB, e.g., ideally within a CP.

For example, the gNB can set the timing advance values TA1=2*P1 for the UE1 and TA2=2*P2 for UE2 to align the receive timings of UL signals transmitted by the UE1 and the UE2 in a normal UL slot as illustrated in FIG. 13. It can then be shown that the interfering UL signal transmitted by the UE2 in the $2^{nd}$ XDD slot is received by the UE1 with a relative timing difference $\Delta_{21}$=P1+P2–P21 when compared to the desired DL signal from the gNB. If the UE1 is scheduled to transmit the UL signal in the $2^{nd}$ XDD slot and the UE2 is scheduled DL reception instead, the UE2 may experience a timing difference $\Delta_{12}$=P2+P1–P12.

Under the assumptions that P12=P21 and TA1=2*P1 and TA2=2*P2, the following observations can be made. First, the value of $\Delta_{21}$ and $\Delta_{12}$ is the same, e.g., the pair UE1 and UE2 experiences the same relative timing difference of the interfering UL signal with respect to the desired DL signal. If the UE1 receives in the DL and the UE2 transmits in the UL or if the UE2 receives in the DL and the UE1 transmits in the UL, the resulting relative timing difference values are the same.

Second, the relative timing difference is largest when P12=P21=0, e.g., UE1 and UE2 are co-located (or at least very close). $\Delta_{21}$=$\Delta_{12}$=TA1=TA2. Third, even at non-zero distances of UE1 and UE2 from the gNB, the relative timing difference can become 0 when P1+P2=P12 (or =P21). Fourth, another pair of UE3 and UE4 may experience a different value for their relative timing difference $\Delta_{34}$=$\Delta_{43}$ when allocated for DL reception and UL transmission in the $3^{rd}$ XDD slot.

Fifth, if the UE3 and the UE2 were both to transmit their UL in the $2^{nd}$ XDD slot while UE1 receives a DL signal from the gNB, the values of the relative timing differences $\Delta_{21}$ and $\Delta_{31}$ may be different, because they depend on the one-way propagation delays of the UE1 (P1), the UE2 (P2), and the UE3 (P3) with respect to the gNB, and the relative distances UE2–UE1 (P21) and UE3–UE1 (P31). When UL signals from multiple UEs are simultaneously transmitted in the XDD slot, the received DL signal is subjected to interference with a spread of relative timing differences with respect to the interfering UL signals.

Note that the relative timing difference value(s) in the full-duplex slot may change more rapidly than the values of the one-way propagation delays with UE movement because of the presence of the one-way delay terms P21 and P31. Sixth, when the gNB sets TA2=2*P2 and TA3=2*P3 for the UE2 and the UE3, their UL transmissions may still be received time-aligned by the gNB in both the normal UL slot and the XDD slot.

Seventh, when TA1≠2*P1 and/or TA2≠2*P2, e.g., when one-way propagation delay is not perfectly compensated through the gNB controlled timing advance procedure, then $\Delta_{21}$≠$\Delta_{12}$. Full-duplex scheduling is not reciprocal anymore with respect to the relative timing difference experienced by the UE1 and the UE2 for the $2^{nd}$ XDD slot. Note that UE-autonomous adjustment of the UE maintained timing advance value to meet the reference timing within the allowed timing error limit is integral part of existing TA procedures when tracking the first detected path (in time) of a DL frame from the serving cell. The UE may adjust the UE's maintained $N_{TA}$ value autonomously. After the random access procedure where the absolute timing advance value is provided to the UE by the gNB during initial access, the gNB often does not know the exact value of the $N_{TA}$ internally maintained by the UE. The gNB can only know the sequence of MAC CE timing commands TA which the gNB has previously issued to the UE in an RRC_CONNECTED mode.

The relative timing difference experienced by a receiving UE in the DL subband of an XDD slot may often be more than the CP, e.g., 4.7 us (or 2.3 us) for 15 (or 30 kHz) SCS. In consequence, the provisioning of guard symbols for a PDCCH, a PDSCH, a PUCCH, and/or a PUSCH transmission and reception becomes necessary to protect the DL and/or UL channels or signals from unwanted UE-to-UE interference in the full-duplex slots. This is detrimental to spectral efficiency and penalizes the DL and/or UL throughputs in TDD cells supporting full-duplex transmissions.

Existing technology allows the configuration of multiple timing advance group(s) (TAG(s)) for a UE when operating in carrier aggregation and/or dual connectivity. A same timing advance command updates UL transmission timing for one or more UL component carriers. Different timing advance commands can be issued for a first and a second group of component carriers. These groups of component carriers are referred to as TAG(s).

Note that the timing advance command for a TAG applies indiscriminately to all UL component carriers of a TAG and the timing advance command applies to any UL transmissions in any UL time resource of a component carrier. In the context of full-duplex operation on a carrier, the configuration and use of carrier aggregation and/or intra-band dual connectivity for purpose of overcoming the described shortcomings of the single-carrier timing advance procedure is very undesirable, because of the resulting RF constraints. Use of the carrier aggregation and/or dual-connectivity results in operational constraints such as the need to support a single-carrier UL mode when simultaneous intra-band Tx and Rx is not possible, additional Rx-Tx switching delays, and reduced UL link budget. A solution is therefore sought after to provide transmission timing control for UEs operating on a carrier in a full-duplex capable TDD network.

Various embodiments of the present disclosure address the above issues and provide additional design aspects for support of transmission timing, and provides solutions as fully elaborated in the following. The disclosure provides methods using multiple UE UL time alignment procedures for a serving cell and using timing slot groups or multiple timing advance groups on a serving cell.

In various embodiments, different timing advance value(s) are signaled to the UE for use in different slot(s) of the same serving cell (NR carrier). In these embodiments, instead of a single signaled timing advance value per UE used to set its UL transmit timing for all its UL slots on the serving cell, the UE uses a signaled timing advance value N_TA,1 in a subband full duplex (SBFD) slot but uses the other signaled value N_TA,2 in the normal UL slot. In another example, the UE uses different signaled timing advance values for different SBFD slots. For example, a signaled timing advanced value can both be absolute, or first signaled value is absolute, and the second signaled value is relative to the first one. In some examples, signaling of configurable values is through RRC, MAC CE or DCI or tabulated; including in some cases a default setting.

In various embodiments, configurable timing slots groups are provided. In these embodiments, a timing slot group is a set of slots associated with same signaled timing advance value. For example, a single serving cell can configure UE with 2 or more timing slot groups. Timing slot groups identify symbols/slots through bitmaps or alike. For example, the timing slot groups may be associated with timer or counter value or priority indicator.

In various embodiments, MAC-CE based signaling for multiple signaled timing advance values is provided. In these embodiments, a UE determines the actual timing advanced value from the signaled index value(s).

In various embodiments, the UE maintains a first and a second timing advance value $N_{TA1}$ and $N_{TA2}$ for a serving cell. The first timing advance value $N_{TA1}$ for a serving cell is associated with UL transmission timing by the UE for a first set of slots on the serving cell. The second timing advance value $N_{TA2}$ for a serving cell is associated with UL transmission timing by the UE for a second set of slots on the serving cell. The first and second set of slots on the serving cell may be referred to as a first timing slot group $TSG_1$ and a second timing slot group $TSG_2$.

A UE can be configured with one or more timing slot group(s) (TSG(s)) for a serving cell where a TSG is a set of slots of a serving cell associated with a same signaled timing advance value. The UE may determine the UL transmission timing in a slot using either the first or the second timing advance value $N_{TA1}$ or $N_{TA2}$, e.g., the UE maintains two independent timing advance loops for the serving cell, one for UL transmissions in the first set of slots and another one for UL transmissions in the second set of slots. A first value $N_{TA1}$ may be used by the UE to determine UL transmission timing in normal UL slots. The second value $N_{TA2}$ may be used by the UE to determine UL transmission timing in a full-duplex slot.

The UE may determine the UL transmission timing in a slot using both the first and the second timing advance value $N_{TA1}$ or $N_{TA2}$, e.g., the UE may maintain two independent timing advance loops, but the UL transmission timing in a slot is determined by the UE using $N_{TA1}$ and $N_{TA2}$ in combination. The timing advance values $N_{TA1}$ and $N_{TA2}$ associated with the UE UL transmission timing in different slot groups may be provided to the UE by MAC CE. Indications to update the first and second timing advance values $N_{TA1}$ and $N_{TA2}$ maintained by the UE for a serving cell may be provided to the UE by a same or by different timing advance command and/or absolute timing advance command MAC CE(s) by means of index values $T_{A1}$ and $T_{A2}$ respectively.

Configuration parameters associated with a timing slot group may be provided to the UE by RRC signaling. A timer value or counter value or priority indicator may be associated with a timing slot group. The UE determines transmission timing in a slot using the transmit timing of the timing slot group configured with a higher priority.

The UE is provided with a first and a second timing advance value $N_{TA1}$ and $N_{TA2}$ for a serving cell. When only a single carrier is configured for the UE, the first and the second timing advance values $N_{TA1}$ and $N_{TA2}$ are provided for that carrier. When carrier aggregation or dual connectivity are configured in the UE, there may be multiple cell groups configured in the UE, e.g., a MCG and/or an SCG. Each of the MCG and/or SCG may comprise one or more component carriers.

Each of the cell groups configured in the UE may be be configured with a TAG. The UE is provided with a first and a second timing advance value $N_{TA1}$ and $N_{TA2}$ for a component carrier. The first and a second timing advance value $N_{TA1}$ and $N_{TA2}$ may be used by the UE to determine the UL transmit timing for multiple component carriers part of the same configured TAG. If a UE is configured with two UL carriers for a serving cell such as when a supplemental UL carrier is configured in the UE, a same timing advance value $N_{TA1}$ and $N_{TA2}$ may be applied to both carriers.

Figure 14:
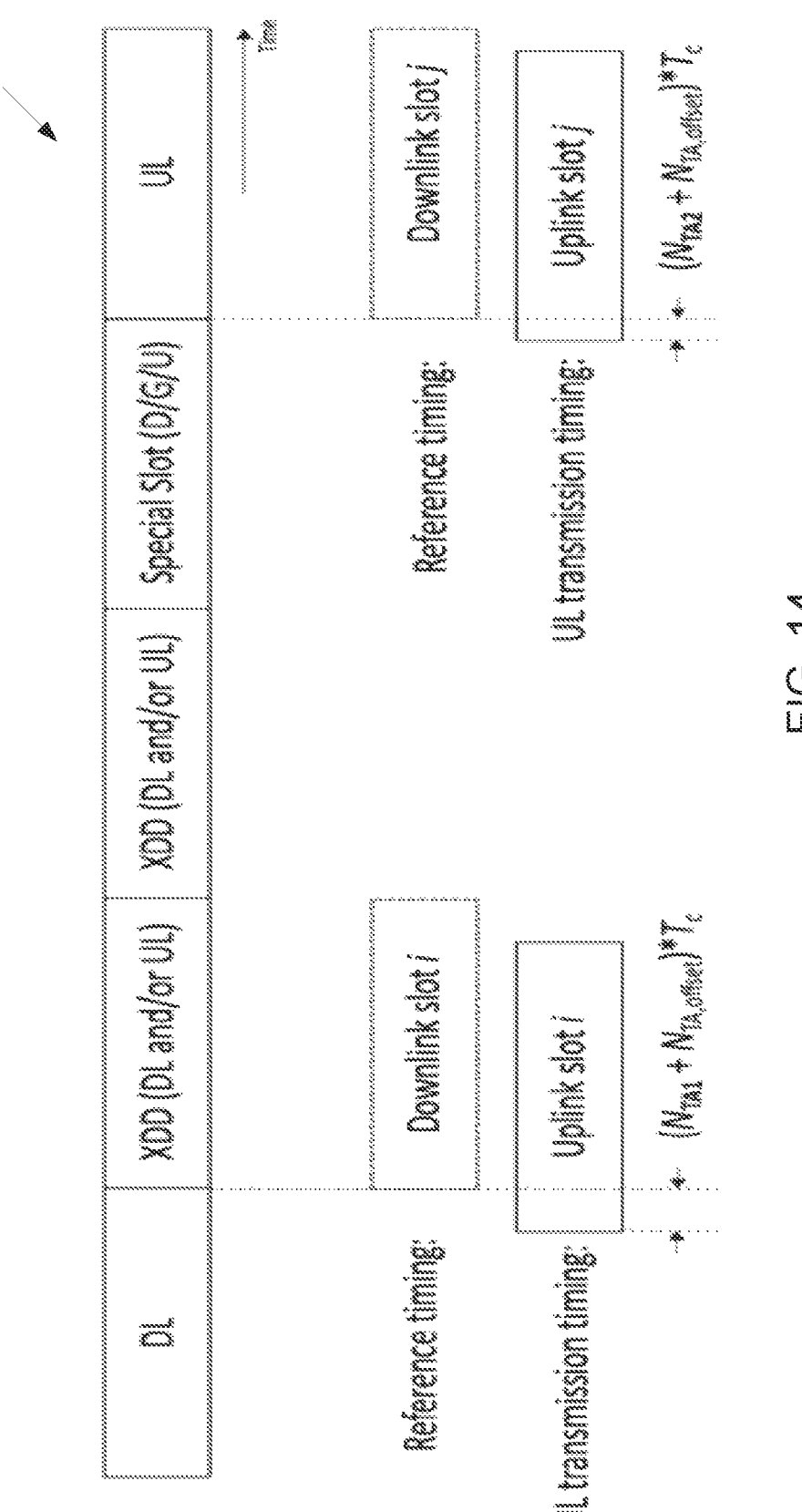
FIG. 14 illustrates an example of UL-DL timing relation with two UL timing alignment procedures per serving cell according to embodiments of the present disclosure.

FIG. 14 illustrates an example of UL-DL timing relation with two UL timing alignment procedures per serving cell 1400 according to embodiments of the present disclosure. An embodiment of the UL-DL timing relation with two UL timing alignment procedures per serving cell 1400 shown in FIG. 14 is for illustration only.

As shown in FIG. 14, a UL slot number i of the serving cell for transmission from the UE starts $(N_{TA1}+N_{TA,offset})*T_c$ before the start of the corresponding DL slot i at the UE where $N_{TA,offset}$ is given in 3GPP standard specification. UL slot number j of the serving cell for transmission from the UE starts $(N_{TA2}+N_{TA,offset})*T_c$ before the start of the corresponding DL slot j at the UE. Note that the determination of a DL reference timing by the UE to adjust the UL transmit timing does not require DL measurements in DL slots i or j. For example, the UE can use SSB(s) transmissions from the gNB in the $1^{st}$ DL slot shown in FIG. 14 to determine the first detected path (in time) for purpose of establishing the DL reference timing of slots i or j.

The UE may determine the UL transmission timing in a slot using either the first or the second timing advance value $N_{TA1}$ or $N_{TA2}$, e.g., the UE maintains two independent timing advance loops for the serving cell, one for UL transmissions in the first set of slots and another one for UL transmissions in the second set of slots. A first value $N_{TA1}$ may be used by the UE to determine UL transmission timing in normal UL slots. The second value $N_{TA2}$ may be used by the UE to determine UL transmission timing in a full-duplex slot.

Upon reception of a timing advance command $N_{TAk}$ for the serving cell, the UE adjusts the UL transmit timing for a PUSCH, a PUCCH, an SRS, or a RACH transmission in the serving cell using the provided timing advance value $N_{TAk}$ for the associated UL slot(s). For example, for slots numbered from 0 to 4 in the UL-DL frame configuration, if a first timing advance value $N_{TA1}$ is associated with slots full-duplex slots 1 and 2 and a second timing advance value $N_{TA2}$ is associated with the normal UL slot 4, the UE adjusts the UL transmit timing of slots 1 and 2 using the provided first timing advance value $N_{TA1}$. The UE adjusts the UL transmit timing of slot 4 using the provided second timing advance value $N_{TA2}$.

If a timing advance offset value $N_{TA,offset}$ is provided to determine the UL transmit timing, the UE expects the offset value to be same for all the slots in the serving cell, Alternatively, different timing advance offset value $N_{TA,offsetk}$ values may be provided. For example, a first timing advance offset value $N_{TA,offset1}$ is associated with slots 1 and 2 and a second timing advance offset value $N_{TA,offset2}$ is associated with slot 4. The UE adjusts the UL transmit timing of slots 1 and 2 using the provided timing advance value $N_{TA1}$ and offset value $N_{TA,offset1}$. The UE adjusts the UL transmit timing of slot 4 using the provided timing advance value $N_{TA2}$ and offset value $N_{TA,offset2}$. There may be different timing advance offsets associated with a timing advance command $N_{TAk}$, e.g., a first offset for an UL channel or signal of a first type and a second offset for an UL channel or signal of a second type.

The UE may determine the UL transmission timing in a slot using both the first and the second timing advance value $N_{TA1}$ or $N_{TA2}$, e.g., the UE maintains two independent timing advance loops, but the UL transmission timing in a slot is determined by the UE using $N_{TA1}$ and $N_{TA2}$ in combination.

Upon reception of a timing advance command $N_{TAk}$ for the serving cell, the UE adjusts the UL transmit timing for a PUSCH, PUCCH, SRS or RACH transmission in the serving cell using one or more provided timing advance value(s) $N_{TAk}$ in the associated UL slot(s). For example, if a first timing advance value $N_{TA1}$ is associated with all slots and a second timing advance value $N_{TA2}$ is associated with full-duplex slots 1 and 2, the UE adjusts the UL transmit timing in slot 4 using the provided first timing advance value $N_{TA1}$. The UE adjusts the UL transmit timing of slot 1 and 2 using both the provided first and second timing advance values $N_{TA1}$ and $N_{TA2}$.

Figure 15:
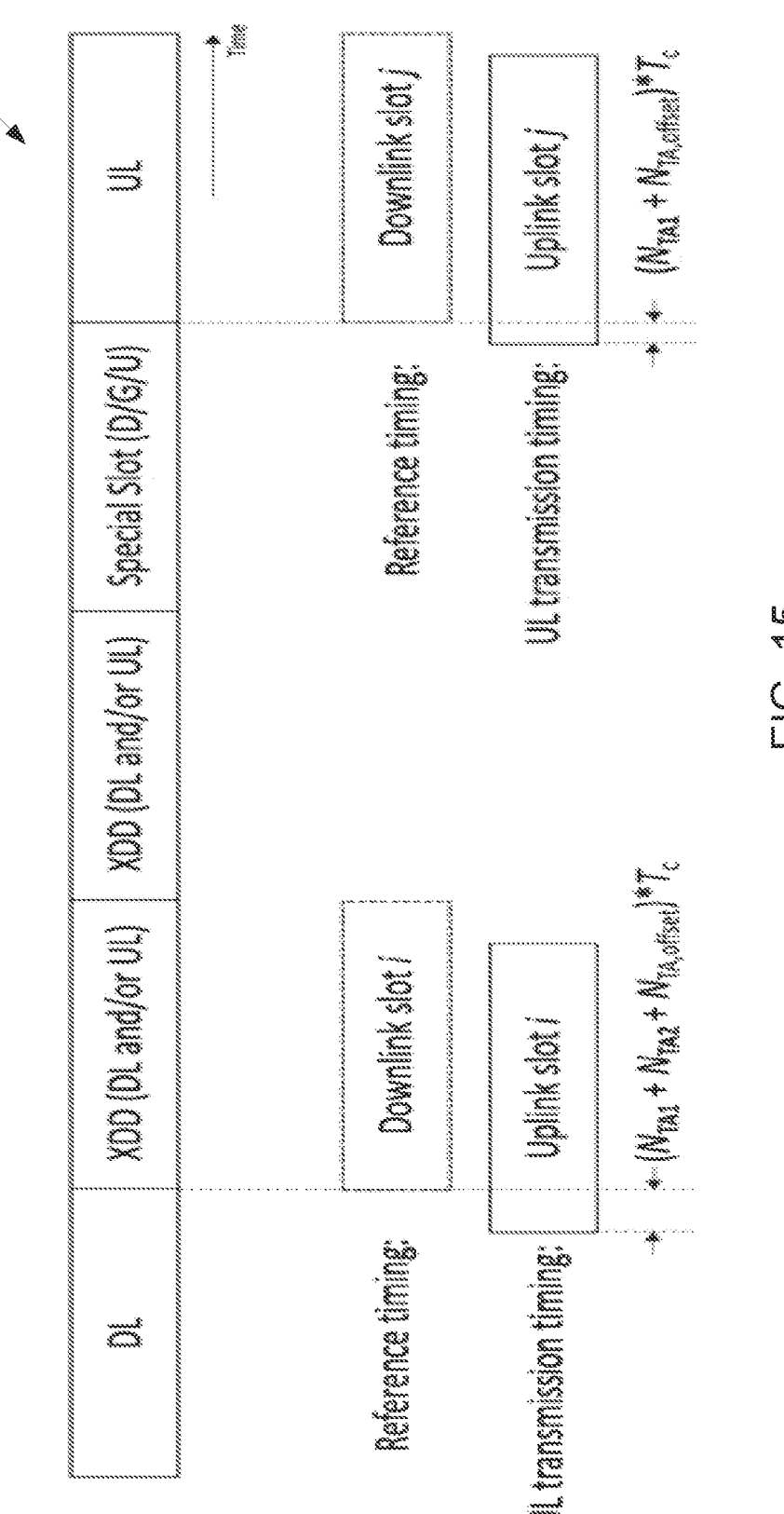
FIG. 15 illustrates another example of UL-DL timing relation with two UL timing alignment procedures per serving cell according to embodiments of the present disclosure.

FIG. 15 illustrates another example of UL-DL timing relation with two UL timing alignment procedures per serving cell 1500 according to embodiments of the present disclosure. An embodiment of the UL-DL timing relation with two UL timing alignment procedures per serving cell 1500 in FIG. 15 is for illustration only.

As shown in FIG. 15, a UL slot number i=1 of the serving cell for transmission from the UE starts $(N_{TA1}+N_{TA2}+N_{TA,offset})*T_c$ before the start of the corresponding DL slot i=1 at the UE. UL slot number j=4 of the serving cell for transmission from the UE starts $(N_{TA1}+N_{TA,offset})*T_c$ before the start of the corresponding DL slot j=4 at the UE. The first timing advance value $N_{TA1}$ in the example of FIG. 15 may be seen as timing advance value of the serving cell for the UE with respect to the gNB location, whereas the second timing advance value $N_{TA2}$ can be seen as an adjustable timing offset value in a selected subset of slots signaled by MAC CE and indexed as a timing advance value for purpose of adjusting reception timing at the location of other UEs in full-duplex slots. If a timing advance offset value $N_{TA,offset}$ is provided to determine the UL transmit timing, the UE expects the offset value to be same for all the slots in the serving cell, Alternatively, different timing advance offset value $N_{TA,offsetk}$ values may be provided. For example, a first timing advance offset value $N_{TA,offset1}$ is associated with all slots and a second timing advance offset value $N_{TA,offset}$ 2 is associated with slots 1 and 2. The UE adjusts the UL transmit timing of slot 4 using the provided timing advance value $N_{TA1}$ and offset value $N_{TA,offset1}$. The UE adjusts the UL transmit timing of slots 1 and 2 using the provided timing advance values $N_{TA1}$ and $N_{TA2}$ and the offset value $N_{TA,offset2}$. There may be different timing advance offsets associated with a timing advance command $N_{TAk}$, e.g., a first offset for an UL channel or signal of a first type and a second offset for an UL channel or signal of a second type.

Instead of a timing advance value $N_{TAk}$ provided for UL transmissions in a slot interval, a timing advance value $N_{TAk}$ may be provided for a symbol time interval or a multiple thereof. The time duration(s) need not be the same for $N_{TA1}$ and $N_{TA2}$. A timing advance value $N_{TAk}$ may be defined with respect to an adjustable or a scalable step size and/or a desired timing resolution. For example, a value for $N_{TAk}$ may be provided as a multiple of $M*64*T_c/2^\mu$ where M=16. The timing resolution or step size for a first and a second timing advance value $N_{TA1}$ and $N_{TA2}$ may be selected the same, e.g., both $N_{TA1}$ and $N_{TA2}$ use $M*64*T_c/2^\mu$, or the timing resolution or step size may be selected different, e.g., $N_{TA1}$ uses a time resolution $M1*64*T_c/2^\mu$ and $N_{TA2}$ uses a time resolution $M2*64*T_c/2^\mu$ where M1 and M2 are different values.

For example, M1=16 for use with $N_{TA1}$ on all slots, but M2=8 for timing adjustment steps using smaller resolution when adjusting for the relative receive timing difference in a full-duplex slot as shown in FIG. 15.

Using a first and a second timing advance value $N_{TA1}$ and $N_{TA2}$ on the same serving cell to control the UL transmit timing of an interfering UE in a full-duplex slot, the relative receive timing difference experienced by an interfered UE receiving DL transmissions from the gNB in the full-duplex slot can be controlled and adjusted for separately. The reception timing of the UL transmissions from an interfering UE in a full-duplex slot can be adjusted differently by the gNB when compared to the reception timing of UL transmissions adjusted by the gNB for that the UE in a normal UL slot on the same carrier or serving cell.

The gNB can adjust the gNB's receiver processing accordingly because the sequence of issued timing advance commands associated with $N_{TA1}$ and $N_{TA2}$ for a UE on the serving cell is known to the gNB. For a UE, the gNB can select and signal the timing advance values associated with the first $N_{TA1}$ and the second $N_{TA2}$ UL transmit timing control control loops using gNB-side and/or UE-reported measurements. For example, UE-transmitted SRS and/or measurements reported from one or multiple UE(s) using the cross-link interference management reporting feature may be used by the gNB to determine the appropriate UL transmit timings of a UE in slots of a serving cell.

A timing advance value $N_{TAk}$ provided to the UE may be associated with a set of slots of a serving cell. A set of slots of a serving cell for which a same transmit timing advance value $N_{TAk}$ is provided to the UE is referred to as timing slot group (TSG) in the disclosure. The first timing advance value $N_{TA1}$ for a serving cell is associated with UL transmission timing by the UE for a first set of slots on the serving cell. The second timing advance value $N_{TA2}$ for a serving cell is associated with UL transmission timing by the UE for a second set of slots on the serving cell. The first and second set of slots on the serving cell may be referred to as a first timing slot group $TSG_1$ and a second timing slot group $TSG_2$.

A UE can be configured with one or more timing slot group(s) (TSG(s)) for a serving cell where a TSG is a set of slots of a serving cell associated with a same signaled timing advance value. A TSG containing a normal UL slot may be referred to as primary timing slot group (PTSG), whereas the term secondary timing slot group (STSG) may refer to other TSGs. For example, an STSG may be configured to comprise slots where full-duplex transmission from/to the base station is possible A TSG may be configured to contain only a single slot, or there may be only a single TSG, e.g., the TSG comprises all slots. The determination of the transmit timing by a UE in a slot may then be described by not using the term "TSG" and substituting the term "slot" for it in the following exemplary procedures described in the disclosure. Instead of the term "TSG," a set of slots of a serving cell for which a same transmit timing advance value $N_{TAk}$ is provided to the UE may be referred to as "timing advance group k of a serving cell j" or $TAG_{j,k}$. The first timing advance value $N_{TA1}$ and the second timing advance value $N_{TA2}$ of a serving cell associated with UL transmit timings of the first and second set of slots of the serving cell respectively, may then be referred to as a first timing advance group $TAG_{j,1}$ and a second timing advance group $TAG_{j,2}$ where index j denotes a serving cell index j. The term "TSG" is used in this disclosure for conciseness.

When a TSG comprise more than one slot, the slots of the TSG can be consecutive, or they can be non-consecutive. One or multiple TSGs may be configured for the UE by parameter n-tsgList. For example, a first TSG containing a normal UL slot may be configured in the UE. A second TSG containing a full-duplex slot may be configured in the UE. When a timing advance value $N_{TAk}$ is provided for a TSG, the value $N_{TAk}$ is applied by the UE to determine UL transmit timing for a slot in the TSG. The timing advance value $N_{TAk}$ is not applied by the UE to determine the UL transmit timing in a slot when the slot is not part of the TSG. One or multiple timing advance values $N_{TAk}$ may be associated with a TSG, e.g., one or more values $N_{TAk}$ may be provided to the UE. When a TSG is associated with a timing advance value $N_{TAk}$, the UE determines a value $N_{TAk}$ in the slot from the set of provided set $N_{TAk}$ values by selecting the value $N_{TAk}$ associated with the TSG of the slot.

Figure 16:
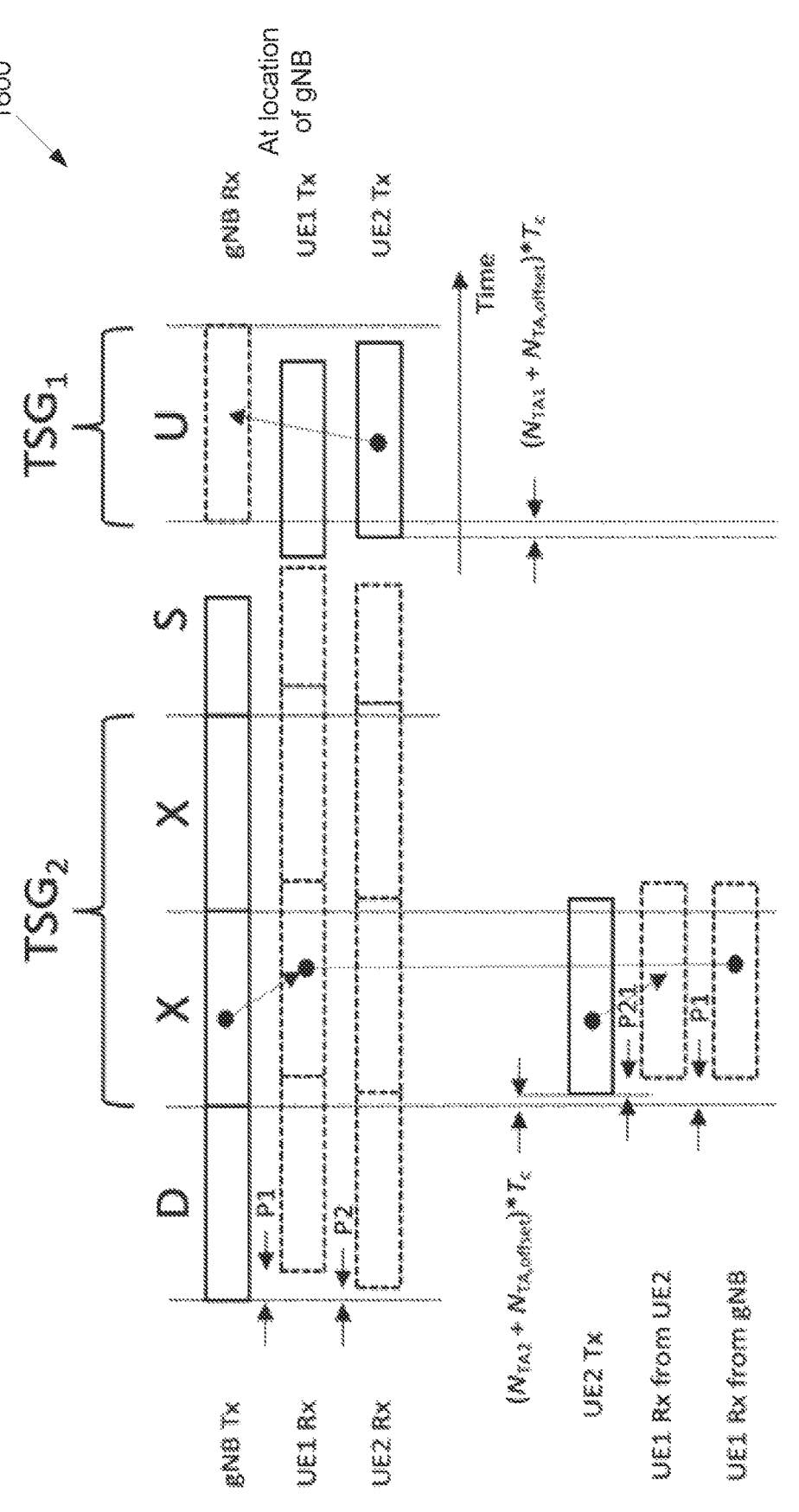
FIG. 16 illustrates an example of UL-DL timing relations with timing slot groups according to embodiments of the present disclosure.

FIG. 16 illustrates an example of UL-DL timing relations with timing slot groups 1600 according to embodiments of the present disclosure. An embodiment of the UL-DL timing relations with timing slot groups 1600 shown in FIG. 16 is for illustration only.

As shown in FIG. 16, a first timing slot group, $TSG_1$ and a second timing slot group $TSG_2$ are configured for a UE2. $TSG_1$ contains the normal UL slot, e.g., slot 4 and $TSG_2$ contains the full-duplex slots, e.g., slot 1 and 2, where slots are numbered from 0 to 4. The UE is provided a first timing advance value $N_{TA1}$ for $TSG_1$ and a second timing advance value $N_{TA2}$ for $TSG_2$. When the UE2 transmits in the UL, the UE determines the UE's transmission timing as $(N_{TA2}+N_{TA,offset})*T_c$ if the UL transmission of PUSCH, SRS, PUCCH, or RACH occurs in a full-duplex slot. The UE determines the UE's transmission timing as $(N_{TA1}+N_{TA,offset})*T_c$ when the UE transmits in the normal UL slot.

The timing advance values $N_{TA1}$ and $N_{TA2}$ associated with the UE UL transmission timing in different slot groups may be provided to the UE by MAC CE. Indications to update the first and second timing advance values $N_{TA1}$ and $N_{TA2}$ maintained by the UE for a serving cell may be provided to the UE by a same or by different timing advance command and/or absolute timing advance command MAC CE(s) by means of index values $T_{A1}$ and $T_{A2}$ respectively. A same or different MAC CEs may be used to provide index values for $T_{A1}$ and $T_{A2}$.

FIG. 17 illustrates an example of multiple timing advance MAC CE 1700 according to embodiments of the present disclosure. An embodiment of the multiple timing advance MAC CE 1700 shown in FIG. 17 is for illustration only.

In one example shown in FIG. 17, the first and a second timing advance value $N_{TA1}$ and $N_{TA2}$ are provided through signaled index values for $T_{A1}$ and $T_{A2}$ in a new multiple timing advance MAC CE. The MAC CE may have length N=2 octets, or N for any required number of octets or bits. The gNB transmits and the UE receives the MAC CE associated with the first and the second timing advance value $N_{TA1}$ and $N_{TA2}$ as part of an DL-SCH transmission.

FIG. 17 shows the example of a length N=2 octets MAC CE format where both the first and a second timing advance value $N_{TA1}$ and $N_{TA2}$ are provided to the UE using the same MAC CE. The MAC CE may be identified by either a selected LCID or a selected eLCID value or a combination of LCID and eLCID values. The MAC CE has fixed size and includes two octets. The MAC CE contains the TAG ID indicating the TAG identity of the addressed TAG. The length of the field is 2 bits. This MAC CE then contains two timing advance commands. The first timing advance command field indicates the index value $T_{A1}$ (0, 1, 2 . . . 63) used to control the amount of timing adjustment that MAC entity may apply for $TSG_1$. The length of the field is 6 bits. The second timing advance command field indicates the index value $T_{A2}$ (0, 1, 2 . . . 63) used to control the amount of timing adjustment that MAC entity may apply for $TSG_2$. The length of the field is 6 bits. The 2 reserved bits "R" are set to "0."

When the UE receives a multiple timing advance MAC CE, the UE determines the first and a second timing advance value $N_{TA1}$ and $N_{TA2}$ from the signaled index values $T_{A1}$ in the timing advance command 1 field and $T_{A2}$ in the timing advance command 2 field for a TAG as adjustment of a current $N_{TA1}$ value, $N_{TA1\_old}$ to the new $N_{TA1}$ value, $N_{TA1\_new}$ by index values of $T_{A1}$=0, 1, 2, . . . , 63, where for a SCS of $2^\mu \cdot 15$ kHz, $N_{TA1\_new}$=$N_{TA1\_old}$+$(T_{A1}-31)*16*64/2^\mu$. Similarly, $N_{TA2}$ is adjusted as $N_{TA2\_new}$=$N_{TA2\_old}$+$(T_{A2}-31)*16*64/2^\mu$.

FIG. 18 illustrates an example of multiple timing advance MAC CE 1800 according to embodiments of the present disclosure. An embodiment of the multiple timing advance MAC CE 1800 shown in FIG. 18 is for illustration only.

In another example shown in FIG. 18, a timing advance value $N_{TAk}$ is provided through signaled index values for $T_{Ak}$ in a new multiple timing advance MAC CE including a TSG identifier (ID). For example, M=2 bits may be used to indicate one of the TSGs of a serving cell for which the indicated index value $T_{Ak}$ is to be applied by the UE. In an alternative technical realization, instead of the TSG ID, more than the 2 bits available for the TAG ID in the existing timing Advance MAC CE are used to transmit index values $T_{Ak}$ and their association with slots on a serving cell for a TAG.

For example, M=4 bits are used to encode the combinations of TAGs and associated time-domain resources associated with a timing advance value on a serving cell. The MAC CE may have length N=1 octet, or N=2 octets, or N for any required number of octets or bits. The gNB transmits and the UE receives the MAC CE associated one or more of the TAG ID, TSG ID and an index value $T_{Ak}$ as part of an DL-SCH transmission.

FIG. 18 shows the example of a length N=2 octets MAC CE format where a TAG ID, TSG ID and an index value $T_{Ak}$ are provided to the UE using the same MAC CE. The MAC CE may be identified by either a selected LCID or a selected eLCID value or a combination of LCID and eLCID values. The MAC CE has fixed size and includes two octets. The MAC CE contains the TAG ID indicating the TAG identity of the addressed TAG. The length of the field is 2 bits. The MAC CE then contains the TSG identity (TSG ID) indicating the TSG identity of the addressed $TSG_k$. The length of the field is 2 bits. This MAC CE then contains a timing advance command. The timing advance command field indicates the index value $T_{Ak}$ (0, 1, 2 . . . 63) used to control the amount of timing adjustment that MAC entity may apply for $TSG_k$. The length of the field is 6 bits. The 6 reserved bits "R" are set to "0."

When the UE receives a multiple timing advance MAC CE, the UE determines the timing advance value $N_{TAk}$ from the signaled index values $T_{Ak}$ in the timing advance command field for the indicated TAG and $TSG_k$ as adjustment of a current $N_{TAk}$ value, $N_{TAk}$ old to the new $N_{TAk}$ value, $N_{TAk\_new}$ by index values of $T_{Ak}$=0, 1, 2, . . . , 63, where for a SCS of $2^\mu$15 kHz, $N_{TAk\_new}$=$N_{TAk\_old}$+$(T_{Ak}-31)*16*64/2^\mu$.

As can be understood by someone skilled in the art, the naming or labeling of the new multiple timing advance MAC CE format or the included IEs for purpose of timing indication is not important for as long as it is distinct from currently named IEs and parameterization provided by 3GPP standard specification. The new multiple timing advance MAC CE may include additional fields not shown in the examples provided by FIG. 17 and FIG. 18. For example, a length indicator L or indicator of the number of TSGs $N_{TSG}$ for which timing advance index(es) are provided in the MAC CE may be included such that a variable instead of a fixed number of timing advance commands can be signaled through the MAC CE. A timer value or counter value or priority indicator associated with a timing slot group $TSG_k$ may be included in the MAC CE. The field length(s) to signal timing indications may be chosen differently as a function of the requires step size and maximum value(s).

Configuration parameters associated with a timing slot group may be provided to the UE by RRC signaling. A timer value or counter value or priority indicator may be associated with a timing slot group. The UE determines transmission timing in a slot using the transmit timing of the timing slot group configured with a higher priority A UE may be provided RRC configuration parameters associated with a first and a second timing advance value $N_{TA1}$ and $N_{TA2}$ for a serving cell. These associated parameters may include one or more of the following, slot(s) in a TSG and timer or counter or priority value(s). These associated parameters may be provided by RRC signaling messages and IEs. For example, and without loss of generality, these associated parameters may be signaled from the gNB to the UE as part of RRC signaling messages of type RRCSetup, RRCReconfiguration, SIB1 or SystemInformation and may be included in RRC IEs of type ServingCell-Config, ServingCellConfigCommon, or ServingCellConfigSIB1. These configuration parameters may be of enumerated, listed or sequence type and/or may be encoded as a bit string.

For example, a configuration for n-tsgList may be provided as SEQUENCE (SIZE (1 ... maxNrofTSGs)) OF Tsg where "Tsg" is a bit string of of size M. For example, M=5 or a multiple thereof. When Tsg={01100}, the $2^{nd}$ and $3^{rd}$ slot or slot 1 and 2 in a sequence of 5 slots numbered from 0 to 4 are part of the timing slot group. When Tsg={00001}, only the last slot in a sequence of 5 slots is indicated as part of the timing slot group.

For example, a timer value t_tsg may be indicated for a timing slot group. The timer value may control how long the MAC entity considers the timing slot group of the serving cells belonging to be uplink time aligned.

For example, a priority value p_tsg may be indicated for a timing slot group in the range P from 0 to 7. When the UL transmit timing of a slot is updated by a UE, the slot duration of a TSG with higher configured priority value is not shortened and the slot duration of a preceding or following slot associated with a lower configured priority value is reduced.

When no values are provided to the UE, the UE may select a default value. A default value may be provided in listed or tabulated form. A default value may be 0.

When a UE determines an UL transmission timing in a slot of a serving cell using a first and a second timing advance value $N_{TA1}$ and $N_{TA2}$ for the serving cell, it may follow the following steps illustrated by example. Note that the shown steps do not necessarily need to be executed in order.

A UL slot number i of the serving cell for transmission from the UE starts $(N_{TAk}+N_{TA,offset})*T_c$ for a slot in $TSG_k$ before the start of the corresponding DL slot i at the UE where a timing advance value $N_{TAk}$ is associated with a timing slot group k, $TSG_k$. $N_{TA,offset}$ is given by 3GPP standard specification, except for MsgA transmission on PUSCH where $N_{TAk}=0$ is used. NR UEs may have the capability to follow the frame timing changes of the reference cell in an RRC_CONNECTED state. The UL frame transmission in $TSG_k$ of a serving cell takes place $N_{TAk}+N_{TA,offset})*T_c$ before the reception of the first detected path (in time) of the corresponding DL frame from the reference cell.

A UE can be configured with one or more TAG and one or more TSG. A TAG is a group of serving cells that is configured by RRC for cells with an UL using the same timing reference cell and the same timing advance value. A timing advance Group containing the SpCell of a MAC entity is referred to as PTAG, whereas the term STAG refers to other TAGs. A TSG is one or more slots of a serving cell using the same timing reference cell and the same timing Advance value. For a serving cell, a UE can be configured by RRC with one or multiple TSG(s) by parameter n-tsgList Upon reception of a timing advance command for a TSG in a TAG, the UE adjusts UL timing for PUSCH, SRS, or PUCCH transmission in a slot of TSG for all the serving cells in the TAG based on a value $N_{TA,offset}$ that the UE expects to be same for all the serving cells in the TAG and based on the received timing advance command for the TSG where the UL timing for PUSCH, SRS or PUCCH transmissions is the same for all the serving cells in a TSG for a TAG.

For a SCS of $2^{\mu} \cdot 15$ kHz, the timing advance command for a TSG in a TAG indicates the change of the UL timing relative to the current UL timing for the TSG in a TAG in multiples of $16 \cdot 64 \cdot T_c / 2^{\mu}$. The start timing of the random access preamble is handled differently by the UE and described in 3GPP standard specification.

A timing advance command received by multiple timing advance command MAC CE (3GPP standard specification), $T_{Ak}$, for a TSG in a TAG indicates adjustment of a current $N_{TAk}$ value, $N_{TAk\_old}$ to the new $N_{TAk}$ value, $N_{TAk\_new}$ by index values of $T_{Ak}=0, 1, 2, \ldots, 63$, where for a SCS of $2^{\mu} \cdot 15$ kHz, $N_{TAk\_new}=N_{TAk\_old}+(T_{Ak}-31)*16*64/2^{\mu}$.

If a UE has multiple active UL BWPs in a same TAG, including UL BWPs in two UL carriers of a serving cell, the timing advance command value for a TSG is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in 3GPP standard specification.

Adjustment of an $N_{TA}$ value by a positive or a negative amount indicates advancing or delaying the UL transmission timing of a TSG in a TAG by a corresponding amount, respectively.

For a timing advance command received on UL slot i and for a transmission other than a PUSCH scheduled by a RAR UL grant or a fallbackRAR UL grant, or a PUCCH with HARQ-ACK information in response to a successRAR, the corresponding adjustment of the UL transmission timing of a TSG applies from the beginning of UL slot i+k+1 where $$k = \left\lceil N_{slot}^{subframe,\mu} \cdot (N_{T,1} + N_{T,2} + N_{TA,max} + 0.5)/T_{sf} \right\rceil,$$

where parameters $N_{T,1}$ and $N_{T,2}$ are provided by 3GPP standard specification, $N_{TA,max}$ is the maximum timing advance value in msec that can be provided by a TA command field of 12 bits, and where $$N_{slot}^{subframe,\mu}$$

and $T_{sf}$ are provided by 3GPP standard specification. The UL slot i is the last slot among UL slot(s) overlapping with the slot(s) of PDSCH reception where the PDSCH provides the timing advance command.

In another example, when a TSG is configured in the UE, the corresponding adjustment of the transmission timing following reception of a timing advance command may be applied either before the first or after the last slot of a sequence of consecutive slots of the TSG, e.g., a same transmit timing during a sequence of consecutive slots configured for the TSG may be maintained by the UE.

If a UE changes an active UL BWP on a serving cell between a time of a timing advance command reception for a TSG and a time of applying a corresponding adjustment for the UL transmission timing for the TSG, the UE determines the timing advance command value based on the SCS of the new active UL BWP. If the UE changes an active UL BWP on a serving cell after applying an adjustment for the UL transmission timing for a TSG, the UE assumes a same absolute timing advance command value before and after the active UL BWP change on the serving cell.

If the received DL timing changes and is not compensated or is only partly compensated by the UL timing adjustment without timing advance command as described in 3GPP standard specification, the UE changes $N_{TAk}$ for a TSG on a serving cell accordingly. If two adjacent slots overlap due to a TA command for a TSG, the slot with lower configured TSG priority provided by RRC parameter p_tsg is reduced in duration relative to the slot configured with higher TSG priority.

An RRC configures the following parameters for the maintenance of UL time alignment: timeAlignmentTimer (per TSG and/or TAG) which controls how long the MAC entity considers the serving cells belonging to the associated TSG in a TAG to be UL time aligned.

When a multiple timing advance command MAC CE is received, and if an $N_{TAk}$ as defined in 3GPP standard specification has been maintained with the indicated TAG, the MAC applies the timing advance command for the indicated TSG(s) in a TAG and starts or restarts the time-AlignmentTimer associated with the indicated TSG(s) in a TAG.

When a timeAlignmentTimer associated with the primary TSG in a primary TAG expires, the MAC entity flushes all HARQ buffers for all serving cells, notifies RRC to release PUCCH and/or SRS for all serving cells, and if configured, clears any configured DL assignments and configured UL grants, clears any PUSCH resource for semi-persistent CSI reporting, considers all running timeAlignmentTimers as expired, but maintains $N_{TAk}$ (3GPP standard specification) for the TSGs in all TAGs. When the timeAlignmentTimer associated with a secondary TSG in a primary TAG or a TSG in a secondary TAG expires, the UE may continue UL transmissions in slots of the primary TSG.

When the MAC entity stops UL transmissions in a TSG of a serving cell due to the fact that the maximum UL transmission timing difference between TSGs of the MAC entity or the maximum UL transmission timing difference between TSGs of any MAC entity of the UE is exceeded, the MAC entity considers the timeAlignmentTimer associated with the TSG as expired.

Figure 19:
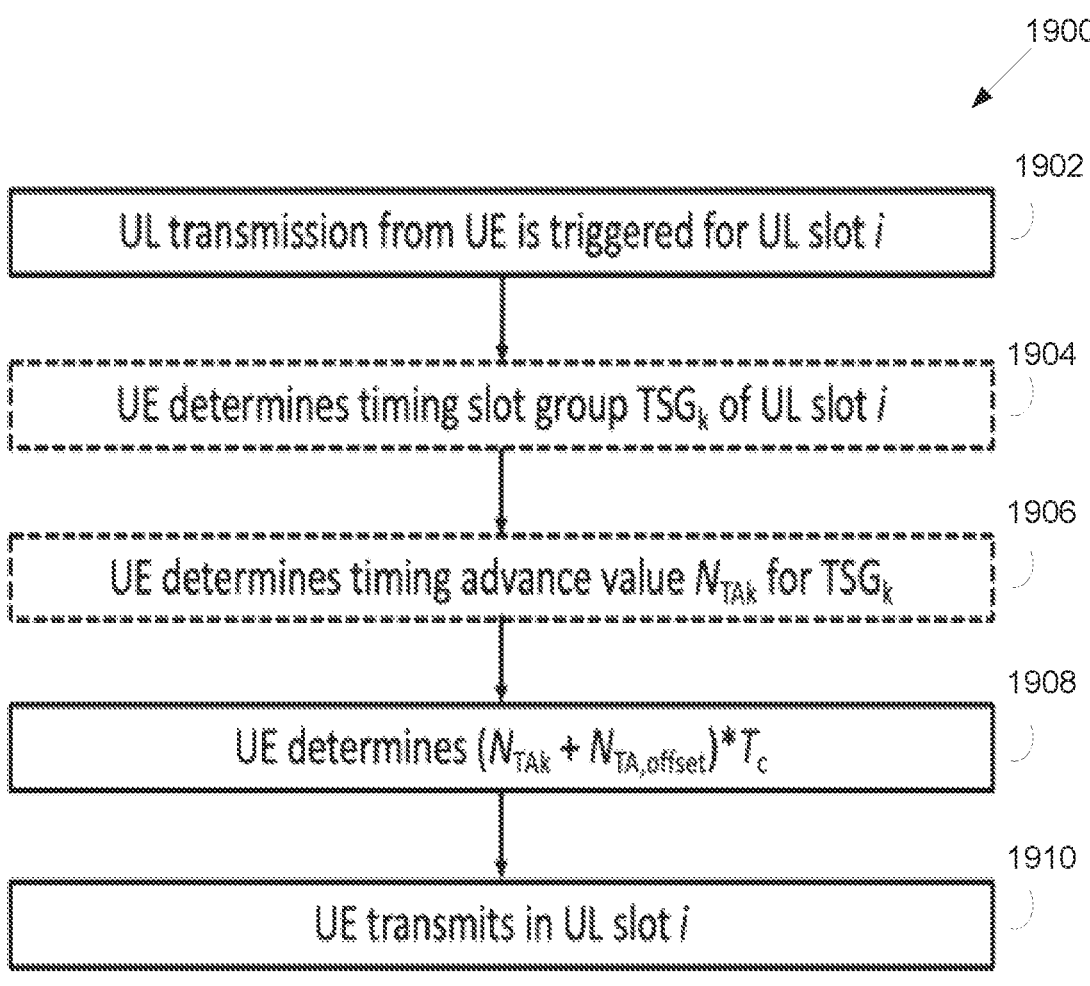
FIG. 19 illustrates a flowchart of UE processing for a determination of UL transmission timing with a timing slot group according to embodiments of the present disclosure.

FIG. 19 illustrates a flowchart 1900 of UE processing for a determination of UL transmission timing with a timing slot group according to embodiments of the present disclosure. The flowchart 1900 as may be performed by a UE (e.g., 111-116 as illustrated in FIG. 1). An embodiment of the flowchart 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

As illustrated in FIG. 19, at step 1902, a UL transmission from a UE is triggered for a UL slot i. Subsequently, in step 1904, the UE determines timing slot group TSG$_k$ of UL slot i. Subsequently, in step 1906, the UE determines timing advance value $N_{TAK}$ for TSG$_k$. Next, in step 1908, the UE determines $(N_{TAK}+N_{TA, offset})$*Tc. Finally, in step 1910, the UE transmits in the UL slot i.

FIG. 19 illustrates an example UE transmit timing processing chain according to embodiments of the disclosure. A UE determines transmit timing for an UL transmission starting in slot i. The UE determines the timing slot group k of the slot i for the UL transmission. The UE determines a timing advance value $N_{TAk}$ for the timing slot group k in which slot i is configured. The UE determines an UL transmit timing for slot i as $(N_{TAk}+N_{TA,offset})$*$T_c$ and applies the UL transmit timing with reference to the timing provided by reception of the first detected path (in time) of the corresponding DL frame (or slot). The UE sets the transmit timing of the UL transmission in UL slot i to the computed value and proceeds with the UL transmission at the determined transmission time.

Figure 20:
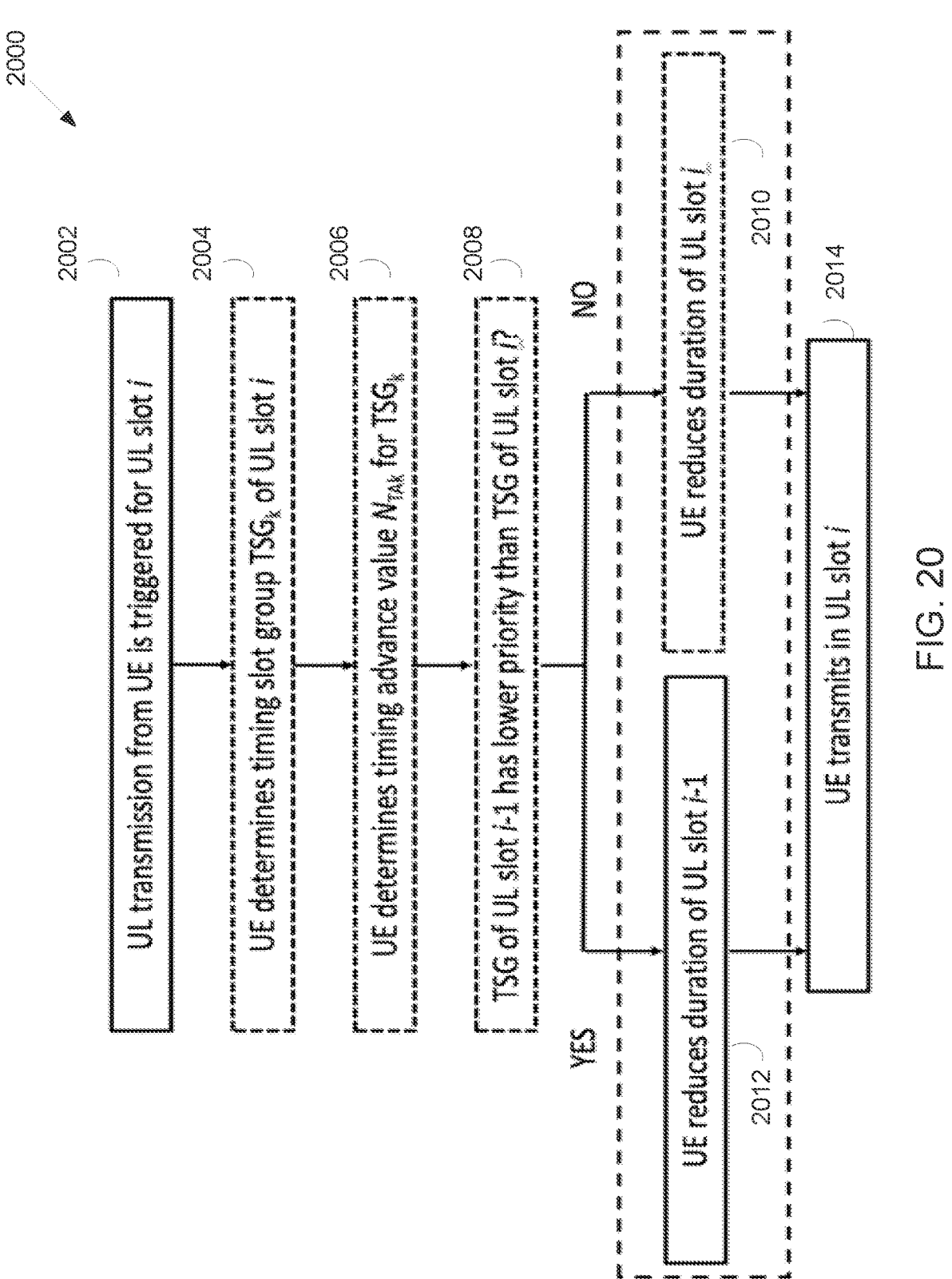
FIG. 20 illustrates a flowchart of UE processing for a determination of UL transmission timing using TSG priority according to embodiments of the present disclosure.

FIG. 20 illustrates a flowchart 2000 of UE processing for a determination of UL transmission timing using TSG priority according to embodiments of the present disclosure. The flowchart 2000 as may be performed by a UE (e.g., 111-116 as illustrated in FIG. 1). An embodiment of the flowchart 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

As illustrated in FIG. 20, at step 2002, a UL transmission from a UE is triggered for a UL slot i. Subsequently, in step 2004, the UE determines timing slot group TSG$_k$ of UL slot i. Subsequently, in step 2006, the UE determines timing advance value $N_{TAK}$ for TSG$_k$. Next, in step 2008, the UE determines whether the TSG of UL slot i−1 has lower priority than TSG of UL slot i. In step 2008, if yes, the UE, in step 2012, reduces duration of UL slot i−1. In step 2008, if no, the UE reduces duration of UL slot i. Finally, in step 2014, the UE transmits in the UL slot i.

FIG. 20 illustrates an example UE transmit timing processing chain according to embodiments of the disclosure. A UE determines transmit timing for an UL transmission starting in slot i. The UE determines the timing slot group k of the slot i for the UL transmission. The UE determines a timing advance value $N_{TAk}$ for the timing slot group k in which slot i is configured. The UE determines an UL transmit timing for slot i as $(N_{TAk}+N_{TA,offset})$*$T_c$. Following the update to the UL transmit timing for slot i, the UE determines if UL transmissions in the adjacent slot i−1 overlap due to the TA command received for TSG$_k$ in slot i.

If yes, the slot with the lower configured TSG priority is reduced in duration relative to the slot configured with higher TSG priority. The UE applies the UL transmit timing for slot i with reference to the timing provided by reception of the first detected path (in time) of the corresponding DL frame (or slot). The UE sets the transmit timing of the UL transmission in UL slot i to the computed value and proceeds with the UL transmission at the determined transmission time.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting an uplink (UL) signal or channel associated with a transmission timing procedure by a user equipment (UE), the method comprising:
   receiving:
      first information for a first timing advance group associated with a first subset of slots from a set of slots on a cell, and
      second information for a second timing advance group associated with a second subset of slots from the set of slots on the cell, wherein the first and second timing advance groups are associated with respective timing advance values and timing advance offset values;
   identifying a condition, wherein the condition is a slot or symbol type;
   determining the slot or symbol type for a slot from the first and second subsets of slots; and
   transmitting the UL signal or channel in the slot based on:
      a first timing advance value associated with the first timing advance group, when the slot or symbol type is non-subband full duplex (non-SBFD), and
      a second timing advance value associated with the second timing advance group, when the slot or symbol type is SBFD.

2. The method of claim 1, wherein:
   a slot from the first subset of slots does not include time domain resources indicated for reception on the cell, and
   a slot from the second subset of slots includes time domain resources indicated for transmission or reception on the cell.

3. The method of claim 1, wherein the first or second information are associated with an index value, respectively, to determine the first or second timing advance value.

4. The method of claim 1, wherein the first and the second information are received using a media access control-control element (MAC CE).

5. The method of claim 1, wherein:
   the condition is further based on one of:
      a slot or symbol number,
      a UL transmission format,
      a timer or counter value, or
      a priority indicator value; and
   the condition is valid when:
      the slot or symbol number is comprised in the first subset of slots,
      the slot or symbol number is not comprised in the first subset of slots,
      the slot or symbol type is one of a downlink (DL) type, a flexible (F) type, or an UL type,
      the timer or counter value is less than or greater than a configured value, or
      the priority indicator value is less than or greater than a configured value.

6. The method of claim 1, further comprising:
   determining the first timing advance value for a first slot from the first subset of slots based on the second timing advance value for a second slot from the second subset of slots and a value received in the first information; and
   using the first timing advance value for the first slot from the first subset of slots.

7. The method of claim 1, further comprising:
   determining a transmission timing for transmitting the UL signal or channel on another cell using the first timing advance value associated with the first subset of slots from the set of slots on the cell; or
   determining the transmission timing transmitting the UL signal or channel on another cell using the second timing advance value associated with the second subset of slots from the set of slots on the cell.

8. A user equipment (UE) comprising:
   a transceiver configured to receive:
      first information for a first timing advance group associated with a first subset of slots from a set of slots on a cell, and
      second information for a second timing advance group associated with a second subset of slots from the set of slots on the cell, wherein the first and second timing advance groups are associated with respective timing advance values and timing advance offset values; and
   a processor operably coupled to the transceiver, the processor configured to:
      identify a condition, wherein the condition is a slot or symbol type, and
      determine the slot or symbol type for a slot from the first and second subsets of slots,
   wherein the transceiver is further configured to transmit an uplink (UL) signal or channel in the slot based on:
      a first timing advance value associated with the first timing advance group, when the slot or symbol type is non-subband full duplex (non-SBFD), and
      a second timing advance value associated with the second timing advance group, when the slot or symbol type is SBFD.

9. The UE of claim 8, wherein:
   a slot from the first subset of slots does not include time domain resources indicated for reception on the cell, and
   a slot from the second subset of slots includes time domain resources indicated for transmission or reception on the cell.

10. The UE of claim 8, wherein the first or second information are associated with an index value, respectively, to determine the first or second timing advance value.

11. The UE of claim 8, wherein the first and the second information are received using a media access control-control element (MAC CE).

12. The UE of claim 8, wherein:

the condition is further based on one of:
   a slot or symbol number,
   a UL transmission format,
   a timer or counter value, or
   a priority indicator value; and the condition is valid when:
   the slot or symbol number is comprised in the first subset of slots,
   the slot or symbol number is not comprised in the first subset of slots,
   the slot or symbol type is one of a downlink (DL) type, a flexible (F) type, or an UL type,
   the timer or counter value is less than or greater than a configured value, or
   the priority indicator value is less than or greater than a configured value.

13. The UE of claim 8, wherein the processor is further configured to:

determine the first timing advance value for a first slot from the first subset of slots based on the second timing advance value for a second slot from the second subset of slots and a value received in the first information; and use the first timing advance value for the first slot from the first subset of slots.

14. The UE of claim 8, wherein the processor is further configured to:

determine a transmission timing for transmitting the UL signal or channel on another cell using the first timing advance value associated with the first subset of slots from the set of slots on the cell; or determine the transmission timing transmitting the UL signal or channel on another cell using the second timing advance value associated with the second subset of slots from the set of slots on the cell.

15. A base station (BS) comprising:

a transceiver configured to transmit:
   first information for a first timing advance group associated with a first subset of slots from a set of slots on a cell,
   second information for a second timing advance group associated with a second subset of slots from the set of slots on the cell, wherein the first and second timing advance groups are associated with respective timing advance values and timing advance offset values, and a condition, wherein the condition is a slot or symbol type; and a processor operably coupled to the transceiver, the processor configured to determine the slot or symbol type for a slot from the first and second subsets of slots, wherein the transceiver is further configured to receive an uplink (UL) signal or channel in the slot based on:
   a first timing advance value associated with the first timing advance group, when the slot or symbol type is non-subband full duplex (non-SBFD), and
   a second timing advance value associated with the second timing advance group, when the slot or symbol type is SBFD.

16. The BS of claim 15, wherein:

a slot from the first subset of slots does not include time domain resources indicated for reception by a user equipment (UE) on the cell, and a slot from the second subset of slots includes time domain resources indicated for transmission or reception by the UE on the cell.

17. The BS of claim 15, wherein the first or second information are associated with an index value, respectively, to determine the first or second timing advance value.

18. The BS of claim 15, wherein the first and the second information are transmitted using a media access control-control element (MAC CE).

19. The BS of claim 15, wherein:

the condition is further based on one of:
   a slot or symbol number,
   a UL transmission format,
   a timer or counter value, or
   a priority indicator value; and the condition is valid when:
   the slot or symbol number is comprised in the first subset of slots,
   the slot or symbol number is not comprised in the first subset of slots,
   the slot or symbol type is one of a downlink (DL) type, a flexible (F) type, or an UL type,
   the timer or counter value is less than or greater than a configured value, or
   the priority indicator value is less than or greater than a configured value.

20. The BS of claim 15, wherein the second timing advance value for a second slot from the second subset of slots and a value in the first information indicate the first timing advance value for a first slot from the first subset of slots.

* * * * *